US011999513B2

(12) United States Patent
Uzo-Okoro et al.

(10) Patent No.: US 11,999,513 B2
(45) Date of Patent: Jun. 4, 2024

(54) UNMANNED SPACECRAFT AND METHOD FOR ASSEMBLING SATELLITES

(71) Applicant: Massachusetts Institute of Technology, Cambridge, MA (US)

(72) Inventors: Ezinne Uzo-Okoro, Medford, MA (US); Kerri L. Cahoy, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 183 days.

(21) Appl. No.: 17/523,656

(22) Filed: Nov. 10, 2021

(65) Prior Publication Data

US 2022/0144460 A1 May 12, 2022

Related U.S. Application Data

(60) Provisional application No. 63/112,136, filed on Nov. 10, 2020.

(51) Int. Cl.
*B64G 4/00* (2006.01)
*B64G 1/10* (2006.01)
*B64G 1/24* (2006.01)
*B25J 9/16* (2006.01)
*B64G 1/22* (2006.01)

(52) U.S. Cl.
CPC ............... *B64G 4/00* (2013.01); *B64G 1/10* (2013.01); *B64G 1/24* (2013.01); *B25J 9/1682* (2013.01); *B25J 9/1687* (2013.01); *B64G 1/223* (2023.08); *B64G 2004/005* (2013.01)

(58) Field of Classification Search
CPC ... B64G 4/00; B64G 1/10; B64G 1/24; B64G 1/223; B64G 2004/005; B64G 1/66; B25J 9/1682; B25J 9/1687
See application file for complete search history.

(56) References Cited

U.S. PATENT DOCUMENTS 7,815,149 B1  10/2010  Howard et al.
8,986,809 B2   3/2015  Gershenfeld et al.
(Continued)

OTHER PUBLICATIONS

Joppin, Carole et al.; "On-Orbit Upgrade and Repair: The Hubble Space Telescope Example"; Journal of Spacecraft and Rockets; vol. 43, No. 3; May-Jun. 2006; 12 Pages.
(Continued)

*Primary Examiner* — Valentina Xavier
(74) *Attorney, Agent, or Firm* — DALY, CROWLEY, MOFFORD & DURKEE, LLP

(57) ABSTRACT

Described is a spacecraft locker configured be deployed in outer space and configured to assemble satellites (e.g., CubeSats) within it and deploy them in outer space. In an embodiment, an unmanned spacecraft includes a housing configured to be deployed in a microgravity environment, the housing having an access point (e.g. a door), a storage area configured to store parts of a satellite, one or more robots movably positioned in the housing, and a controller configured to control at least one of the one or more robots to access parts from the storage area and to assemble the parts on an assembly platform of the housing. The controller may also control deployment of the assembled satellite through the door of the housing to a position in the microgravity environment.

20 Claims, 17 Drawing Sheets

(56) References Cited

U.S. PATENT DOCUMENTS

| | | | |
|---|---|---|---|
| 10,526,095 B2 * | 1/2020 | Blincow | B64G 1/646 |
| 11,014,303 B1 * | 5/2021 | Higham | B29C 64/118 |
| 2017/0029765 A1 * | 2/2017 | Vellinger | A61L 27/54 |
| 2017/0036783 A1 * | 2/2017 | Snyder | B23K 9/044 |

OTHER PUBLICATIONS

Karlow, Brandon, et al.; "Tradespace investigation of strategic design factors for large space telescopes"; Journal of Astronomical Telescopes, Instruments, and Systems; vol. 1, No. 2; Apr.-Jun. 2015; 23 Pages.

Northrop Grumman; "Companies Demonstrate Groundbreaking Satellite Life-Extension Service"; Northrop Grumman Newsroom (https://news.northropgrumman.com/news/releases/northrop-grumman-successfully-completes-historic-first-docking-of-mission-extension-vehicle-with-intelsat-901-satellite); Feb. 26, 2020; 3 Pages.

Rodgers, Lennon, et al.; "Development of the miniature video docking sensor"; Proc. SPIE 6221, Modeling, Simulation, and Verification of Space-based Systems III, 62210E; May 31, 2006; 13 Pages.

Steimle, Per C., et al. "Commercial Approach to Research Outside the International Space Station—A Small Size Precursor Service for Future In-Orbit Testing"; AIAA Space 2014 Conference and Exposition; Aug. 4-7, 2014; 11 Pages.

Steimle, Christian, et al.; "ISS External Payload Platform-a new opportunity for research in the space environment"; 40th COSPAR Scientific Assembly; Aug. 2014; 1 Page.

Sun, Yongjun, et al. "Design and Optimization of a Novel Six-Axis Force/Torque Sensor for Space Robot"; Proceeding of the IEEE International Conference on Robotics and Biomimetics (ROBIO); Dec. 2013; 8 Pages.

Walker, Michael, et al.; "An Adaptive control of space-based robot manipulators"; IEEE Transactions on Robotics and Automation; vol. 7, No. 6; Dec. 1991; 8 Pages.

Zuniga, David, et al.; "Conceptual Development of a Payload Thermal and Pressure Control System for a Small Payload Quick Return Vehicle"; 40th International Conference on Environmental Systems; Jul. 2010; 9 Pages.

U.S. Appl. No. 17/591,234, filed Feb. 2, 2022, Ariel Ekblaw, et al.

Barnhart, David, et al. "Changing Satellite Morphology Through Cellularization." AIAA Space 2012 Conference & Exposition; Sep. 11, 2012; 10 Pages.

Belvin, Wendel K., et al. "In-space structural assembly: Applications and technology." 3rd AIAA Spacecraft Structures Conference; Jan. 1, 2016; 11 Pages.

Bruner, Wesley, et al. "Mechanism analysis and verification approach for ISS truss assembly." 37th Aerospace Mechanisms Symposium; May 2004; 17 Pages.

"CubeSat Design Specifications (CDS)." CubeSat Design Specifications Rev. 12, The CubeSat Program, Cal Podly SLO; Aug. 1, 2009; 22 Pages.

Doggrell, Les. "Operationally Responsive Space: A Vision for The Future of Military Space" Air Univ Maxwell AFB AI Airpower Journal; Jan. 1, 2006; 11 Pages.

Doggett, William. "Robotic assembly of truss structures for space systems and future research plans." Proceedings, IEEE Aerospace Conference; Mar. 2002; 10 Pages.

Fiorillo, Fausto, et al. "Soft magnets for passive attitude stabilization of small satellites." IEEE Transactions on Magnetics; Jan. 19, 2010; 4 Pages.

Flores-Abad, Angel, et al. "A Review of Space Robotics Technologies for On-Orbit Servicing." Progress in Aerospace Sciences; Jul. 2014; 7 Pages.

Soulage, Michael et al. "Flexible, High Speed, Small Satellite Production." 33$^{rd}$ Annual AIAA/USU Conference on Small Satellites; Jul. 16, 2019; 4 Pages.

Grim, Braden, et al. "MakerSat: A CubeSat Designed for In-Space 3D Print and Assembly." 30 th Annual AIAA/USU Conference on Small Satellites; Aug. 5, 2016; 9 Pages.

Hill, Lisa, et al. "The Market for Satellite Cellularization: A Historical View of The Impact of The Satlet Morphology on The Space Industry." AIAA Space 2013 Conference and Exposition; Sep. 10, 2013; 12 Pages.

Hirzinger, Gerd, et al. "On a New Generation of Torque Controlled Light-Weight Robots." Proceedings 2001 ICRA. IEEE International Conference on Robotics and Automation (Cat. No. 01CH37164). vol. 4; May 2001; 8 Pages.

Hirzinger, G., et al. "Robotics and mechatronics in aerospace." 7th International Workshop on Advanced Motion Control. Proceedings (Cat. No. 02TH8623); Jul. 2002; 9 Pages.

Hirzinger, Gerd, et al. "Sensor-based space robotics—ROTEX and its telerobotic features." IEEE Transactions on robotics and automation; Oct. 1993; 15 Pages.

James, Stephen, et al. "Sim-to-real via sim-to-sim: Data-efficient robotic grasping via randomized-to-canonical adaptation networks." Proceedings of the IEEE/CVF Conference on Computer Vision and Pattern Recognition (CVPR); Jun. 2019; 11 Pages.

Jaeger, Talbot, et al. "Satlets-the Building Blocks of Future Satellites—And Which Mold Do You Use?" AIAA Space 2013 Conference and Exposition; Sep. 10, 2013; 11 Pages.

Kawasaki, Kazuyoshi. "Overview of JEM-EF on ISS." Proceedings of the RIKEN Symposium. Saitama; Feb. 27, 2009; 3 Pages.

Kelm, B.E. et al. "FREND: Pushing the Envelope of Space Robotics. Space Research and Satellite Technology." Naval Research Lab; Jan. 1, 2008; 4 Pages.

Kerzhner, Aleksandr A., et al. "Architecting Cellularized Space Systems Using Model-Based Design Exploration." AIAA Space 2013 Conference and Exposition; Sep. 10, 2013; 24 Pages.

Keys, Andrew, et al. "A review of NASA's radiation-hardened electronics for space environments project." AIAA Space 2008 Conference & Exposition; Jun. 15, 2012; 7 Pages.

Kingsbury, R., et al. "TID tolerance of popular CubeSat components." 2013 IEEE Radiation Effects Data Workshop (REDW); Jul. 2013; 5 Pages.

Langford, Will, et al. "Hierarchical assembly of a self-replicating spacecraft." 2017 IEEE Aerospace Conference; Mar. 2017; 11 Pages.

Laryssa, Patten, et al. "International Space Station Robotics: A Comparative Study of ERA, JEMRMS and MSS." 7th ESA Workshop on Advanced Space Technologies for Robotics and Automation 'ASTRA 2002' ESTEC; Nov. 2002; 8 Pages.

LeMaster, Edward, et al. "Experimental Demonstration of Technologies for Autonomous On-Orbit Robotic Assembly." Space 2006; Jun. 18, 2012; 14 Pages.

Li, Y. F. et al. "On the dynamic behavior of a force/torque sensor for robots." Proceedings 2001 ICRA. IEEE International Conference on Robotics and Automation (Cat. No. 01CH37164); Feb. 1998; 5 Pages.

Liu, Guangjun, et al. "A base force/torque sensor approach to robot manipulator inertial parameter estimation." 1998 IEEE International Conference on Robotics and Automation (Cat No. 98CH36146); May 1998; 6 Pages.

Lymer, John, et al. "Commercial application of in-space assembly." AIAA Space 2016; Sep. 9, 2016; 17 Pages.

"MakerSat: A CubeSat mission designed for In-Space 3D Print and Assembly" https://directory.eoportal.org/web/eoportal/satellite-missions/m/makersat; Aug. 2016; 16 Pages.

Murbach, Marcus S., et al. "The SPQR as an Option for Returning Payloads from the ISS after the Termination of STS Flights." Proceedings of the 40th International Conference on Environmental System; Jul. 2010; 12 Pages.

Murugesan, S. "An overview of electric motors for space applications." IEEE Transactions on Industrial Electronics and Control Instrumentation; Nov. 1981; 6 Pages.

Nogales, Connor "NNU's MakerSat-1 CubeSat Assembly" https://www.youtube.com/watch?v=shLPETczsF4; Jan. 19, 2017; 1 Page.

(56) References Cited

OTHER PUBLICATIONS

Paus, Fabian, et al. "A combined approach for robot placement and coverage path planning for mobile manipulation." 2017 IEEE/RSJ International Conference on Intelligent Robots and Systems (IROS); Sep. 2017; 8 Pages.
Rawashdeh, Samir Ahmed. "Passive attitude stabilization for small satellites." Jan. 2010; 73 Pages.
Roa, Maximo A., et al. "Robotic Technologies for In-Space Assembly Operations." 14th Symposium Advanced Space Technologies in Robotics and Automation (ASTRA); Jun. 2017; 8 Pages.
Selva, Daniel, et al. "A Survey and Assessment of the Capabilities of Cubesats for Earth observation." Acta Astronautica; May 2012; 20 Pages.
Shimmin, Rogan, et al. "The successful PhoneSat WiFi experiment on the Soarex-8 flight." 2016 IEEE Aerospace Conference; Mar. 2016; 10 Pages.
Sternberg, David, et al. "Multidisciplinary system design optimization of on orbit satellite assembly architectures." 2015 IEEE Aerospace Conference; Mar. 2015; 15 Pages.
Spensieri, Domenico, et al. "Optimal robot placement for tasks execution." Procedia CIRP; May 11, 2016; 6 Pages.
Stevo, Stanislav, et al. "Optimization of robotic arm trajectory using genetic algorithm." IFAC Proceedings; Aug. 2014; 6 Pages.
Springmann, John C. et al. "Investigation of the on-orbit conjunction between the MCubed and HRBE CubeSats." 2013 IEEE Aerospace Conference; Mar. 2013; 8 Pages.
Tsujimura, Takeshi, and Tetsuro Yabuta. "Object detection by tactile sensing method employing force/torque information." IEEE Transactions on robotics and Automation; Aug. 1989; 7 Pages.
Walker, Roger, et al. "Deep-space CubeSats: thinking inside the box." Astronomy & Geophysics; Oct. 2018; 7 Pages.
Abdel-Rahman, Amira et al. "Space Ants: Constructing and Reconfiguring Large-Scale Structures with Finite Automata (Media Exposition)." 36th International Symposium on Computational Geometry; Jan. 1, 2020; 6 Pages.
Domingos, Jorge L.C. et al. "Self-assembly of Rigid Magnetic Rods Consisting of Single Dipolar Beads in Two Dimensions." Physical Review E; Jul. 17, 2017; 9 Pages.
Ekblaw, Ariel et al. "Self-Assembling Space Structures: Buckminsterfullerene Sensor Nodes." 2018 AIAA/AHS Adaptive Structures Conference; Jan. 2018; 15 Pages.
Ekblaw, Ariel et al. "TESSERAE: Self-Assembling Shell Structures for Space Exploration." International Association of Shell and Spatial Structures (IASS); Jul. 16, 2018; 8 Pages.
Ekblaw, Ariel et al. "Self-assembling Space Architecture: Tessellated Shell Structures for Space Habitats." Proceedings of the Annual Symposium of the International Association of Shell and Spatial Structures (IASS): Extraplanetary Architecture; 2018; 12 Pages.
Ekblaw, Ariel et al. "Self-Assembling Space Habitats: TESSERAE: Design and Mission Architecture." 2019 IEEE Aerospace Conference; Mar. 2019; 11 Pages.
Ekblaw, Ariel et al. "Space Habitat Reconfigurability: TESSERAE: Platform for Self-Aware assembly." 70th International Astronautical Congress (IAC) by the International Astronautical Federation (IAF); Oct. 2019; 12 Pages.
Ekblaw, Ariel C. "Self-Aware Self-Assembly for Space Architecture: Growth Paradigms for In-Space Manufacturing."—Part 1; PhD diss., Massachusetts Institute of Technology; Sep. 2020; 40 Pages.
Ekblaw, Ariel C. "Self-Aware Self-Assembly for Space Architecture: Growth Paradigms for In-Space Manufacturing."—Part 2; PhD diss., Massachusetts Institute of Technology; Sep. 2020; 40 Pages.
Ekblaw, Ariel C. "Self-Aware Self-Assembly for Space Architecture: Growth Paradigms for In-Space Manufacturing."—Part 3; PhD diss., Massachusetts Institute of Technology; Sep. 2020; 40 Pages.
Ekblaw, Ariel C. "Self-Aware Self-Assembly for Space Architecture: Growth Paradigms for In-Space Manufacturing."—Part 4; PhD diss., Massachusetts Institute of Technology; Sep. 2020; 41 Pages.
Ekblaw, Ariel C. "Self-Aware Self-Assembly for Space Architecture: Growth Paradigms for In-Space Manufacturing."—Part 5; PhD diss., Massachusetts Institute of Technology; Sep. 2020; 41 Pages.
Ekblaw, Ariel C. "Self-Aware Self-Assembly for Space Architecture: Growth Paradigms for In-Space Manufacturing."—Part 6; PhD diss., Massachusetts Institute of Technology; Sep. 2020; 29 Pages.
Ekblaw, Ariel et al. "Self-Assembling and Self-Regulating Space Stations: Mission Concepts for Modular, Autonomous Habitats." 50th International Conference on Environmental Systems; Jul. 2021; 16 Pages.
Gettliffe, Gwendolyn Vines. "Stability Analysis of Electromagnetically Supported Large Space Structures."—Part 1; PhD diss., Massachusetts Institute of Technology; Feb. 2016; 40 Pages.
Gettliffe, Gwendolyn Vines. "Stability Analysis of Electromagnetically Supported Large Space Structures."—Part 2; PhD diss., Massachusetts Institute of Technology; Feb. 2016; 41 Pages.
Gettliffe, Gwendolyn Vines. "Stability Analysis of Electromagnetically Supported Large Space Structures."—Part 3; PhD diss., Massachusetts Institute of Technology; Feb. 2016; 41 Pages.
Gettliffe, Gwendolyn Vines. "Stability Analysis of Electromagnetically Supported Large Space Structures."—Part 4; PhD diss., Massachusetts Institute of Technology; Feb. 2016; 41 Pages.
Gettliffe, Gwendolyn Vines. "Stability Analysis of Electromagnetically Supported Large Space Structures."—Part 5; PhD diss., Massachusetts Institute of Technology; Feb. 2016; 41 Pages.
Gettliffe, Gwendolyn Vines. "Stability Analysis of Electromagnetically Supported Large Space Structures."—Part 6; PhD diss., Massachusetts Institute of Technology; Feb. 2016; 41 Pages.
Gettliffe, Gwendolyn Vines. "Stability Analysis of Electromagnetically Supported Large Space Structures."—Part 7; PhD diss., Massachusetts Institute of Technology; Feb. 2016; 16 Pages.
Gilpin, Kyle et al. "Robot Pebbles: One Centimeter Modules for Programmable Matter Through Self-Disassembly." 2010 IEEE International Conference on Robotics and Automation; May 2010; 9 Pages.
Hacohen, Adar et al. "Meshing Complex Macro-Scale Objects into Self-Assembling Bricks." Scientific Reports; Jul. 30, 2015; 8 Pages.
Haghighat, Bahar et al. "Lily: A Miniature Floating Robotic Platform for Programmable Stochastic Self-Assembly." 2015 IEEE International Conference on Robotics and Automation (ICRA); May 2015; 8 Pages.
Jenett, Benjamin et al. "Design of Multifunctional Hierarchical Space Structures." 2017 IEEE Aerospace Conference; Mar. 2017; 10 Pages.
Knaian, Ara N. "Electropermanent Magnetic Connectors and Actuators: Devices and Their Application in Programmable Matter."—Part 1; Doctoral Dissertation, Massachusetts Institute of Technology; 2010; 40 Pages.
Knaian, Ara N. "Electropermanent Magnetic Connectors and Actuators: Devices and Their Application in Programmable Matter."—Part 2; Doctoral Dissertation, Massachusetts Institute of Technology; 2010; 41 Pages.
Knaian, Ara N. "Electropermanent Magnetic Connectors and Actuators: Devices and Their Application in Programmable Matter."—Part 3; Doctoral Dissertation, Massachusetts Institute of Technology; 2010; 41 Pages.
Knaian, Ara N. "Electropermanent Magnetic Connectors and Actuators: Devices and Their Application in Programmable Matter."—Part 4; Doctoral Dissertation, Massachusetts Institute of Technology; 2010; 41 Pages.
Knaian, Ara N. "Electropermanent Magnetic Connectors and Actuators: Devices and Their Application in Programmable Matter."—Part 5; Doctoral Dissertation, Massachusetts Institute of Technology; 2010; 45 Pages.
Kong, Edmund Mun Choong. "Spacecraft Formation Flight Exploiting Potential Fields."—Part 1; PhD diss., Massachusetts Institute of Technology; 2002; 92 Pages.

(56) References Cited

OTHER PUBLICATIONS

Kong, Edmund Mun Choong. "Spacecraft Formation Flight Exploiting Potential Fields."—Part 2; PhD diss., Massachusetts Institute of Technology; 2002; 92 Pages.

Lee, Nicolas N. et al. "Architecture for In-Space Robotic Assembly of a Modular Space Telescope." Journal of Astronomical Telescopes, Instruments, and Systems; Jul. 11, 2016; 16 Pages.

Nisser, Martin et al. "An Electromagnetically Actuated, Self-Reconfigurable Space Structure." JSASS Aerospace Tech. Japan; Apr. 16, 2017; 9 Pages.

Otero, Alvar Saenz et al. "SPHERES: Development of an ISS laboratory for formation flight and docking research." IEEE Aerospace Conference; Mar. 2002; 15 Pages.

Pei, Jing et al. "Autonomous Rendezvous and Docking of Two 3U Cubesats Using a Novel Permanent-Magnet Docking Mechanism" 54th AIAA Aerospace Sciences Meeting, AIAA SciTech Forum; Jan. 2016; 14 Pages.

Pettazzi, Lorenzo et al. "Electrostatic Forces for Satellite Swarm Navigation and Reconfiguration."—Part 1; ESA Final Report; Jun. 2006; 56 Pages.

Pettazzi, Lorenzo et al. "Electrostatic Forces for Satellite Swarm Navigation and Reconfiguration."—Part 2; ESA Final Report; Jun. 2006; 57 Pages.

Rubenstein, Michael et al. "Programmable self-assembly in a thousand-robot swarm." Science; Aug. 15, 2014; 6 Pages.

"Self-Assembly Lab" https://selfassemblylab.mit.edu/; Accessed May 25, 2017; 1 Page.

Tibbits, Skylar et al. "Biomolecular, Chiral and Irregular Self-Assemblies." 33$^{rd}$ Annual Conference of the Association for Computer Aided Design in Architecture; Oct. 2013; 8 Pages.

Tibbits, Skylar et al. "Programmable materials for architectural assembly and automation." Assembly Automation; Jul. 27, 2012; 11 Pages.

Tsujimura, Takeshi, et al. "Object detection by tactile sensing method employing force/torque information." IEEE Transactions on robotics and Automation; Aug. 1989; 7 Pages.

Whitesides, George M. et al. "Self-assembly at all scales." Science; Mar. 29, 2002; 4 Pages.

Whitesides, George M. et al. "Beyond molecules: Self-assembly of mesoscopic and macroscopic components." National Academy of Sciences; Apr. 16, 2002; 6 Pages.

Bualat et al.; "Astrobee: Developing a free-flying robot for the international space station"; Aerospace Research Central; Aug. 28, 2015; 10 Pages.

Katz et al.; "NASA advances robotic space exploration"; Computer—Printed by IEEE Computer Society—Cover Feature; Jan. 2003; 10 Pages.

Mohon; "NASA's Dragonfly Project Demonstrates Robotic Satellite Assembly Critical to Future Space Infrastructure Development"; Sep. 13, 2017; 5 Pages.

Nanoracks "How to build a nanolab payload"; Powerpoint Presentation; https://nanoracks.com/wp-content/uploads/How-to-Build-a-NanoRacks-Payload.pdf; Printed Nov. 28, 2023; 15 Pages.

Nanoracks Technical Resources; https://nanoracks.com/resources/; 6 pages.

NASA "CubeSat Launch Initiative"; https://www.nasa.gov/kennedy/launch-services-program/cubesat-launch-initiative/; Printed Nov. 28, 2023; 7 Pages.

NASA "International Space Station"; https://www.nasa.gov/international-space-station/; Printed Nov. 28, 2023; 13 Pages.

Patane et al.; "Design Reference Missions for Archinaut: A Roadmap for In-Space Robotic Manufacturing and Assembly"; AIAA; Manufacturing and Construction Technologies; Sep. 15, 2018; 7 Pages.

Piskorz et al.; "On-Orbit Assembly of Space Assets: A Path to Affordable and Adaptable Space Infrastructure"; The Aerospace Corporation; Center for Space Policy and Strategy; Feb. 2018; 12 Pages.

Putz; "Space robotics in Europe: A survey"; Robotics and Autonomous Systems; vol. 23; 1998; 14 Pages.

Reed et al.; "The Restore-L Servicing Mission"; Presented to the NAC Technology, Innovation and Engineering Committee; Mar. 29, 2016; 32 Pages.

Sallaberger et al.; "Canadian space robotic activities"; Acta Astronautica; vol. 41, No. 4; 1997; 8 Pages.

Saplan; "Robotic Servicing of Geosynchronous Satellites (RSGS)"; https://www.darpa.mil/program/robotic-servicing-of-geosynchronous-satellites; Printed Nov. 16, 2023; 3 Pages.

Sinclair et al.; "Radiation effects and COTS parts in SmallSats"; 2013; 12 Pages.

Trad.fr. Home Page; https://trad.fr; Nov. 28, 2023; 5 Pages.

Underwood et al.; "Using CubeSat/micro-satellite technology to demonstrate the autonomous assembly of a reconfigurable space telescope"; Acta Astronautica; vol. 114; 2015; 11 Pages.

Uzo-Okoro; "Black Swans: Space asset control using space-manufactured microsatellites"; NASA—DARPA; Nov. 2017; 11 Pages.

Watson et al.; "A history of astronaut construction of large space structure at NASA Langley Research center"; Proceedings, IEEE Aerospace Conference; vol. 7; Mar. 9, 2002; 18 Pages.

Weisbin et al.; "NASA robotics research for planetary surface exploration"; IEEE Robotics & Automation Magazine; Dec. 2000; 10 Pages.

Whelan et al.; "DARPA orbital express program: effecting a revolution in space-based system"; Proceedings of SPIE; 4136; Small Payloads in Space; Nov. 7, 2000; 10 Pages.

\* cited by examiner

1: Modular board placed by right arm

2: Second modular board placed by left arm

3: Third modular board placed by left arm

4: Processor board placed by left arm

5: Final side panel circuit board is assembled

6: All six modular boards fastened by magnets

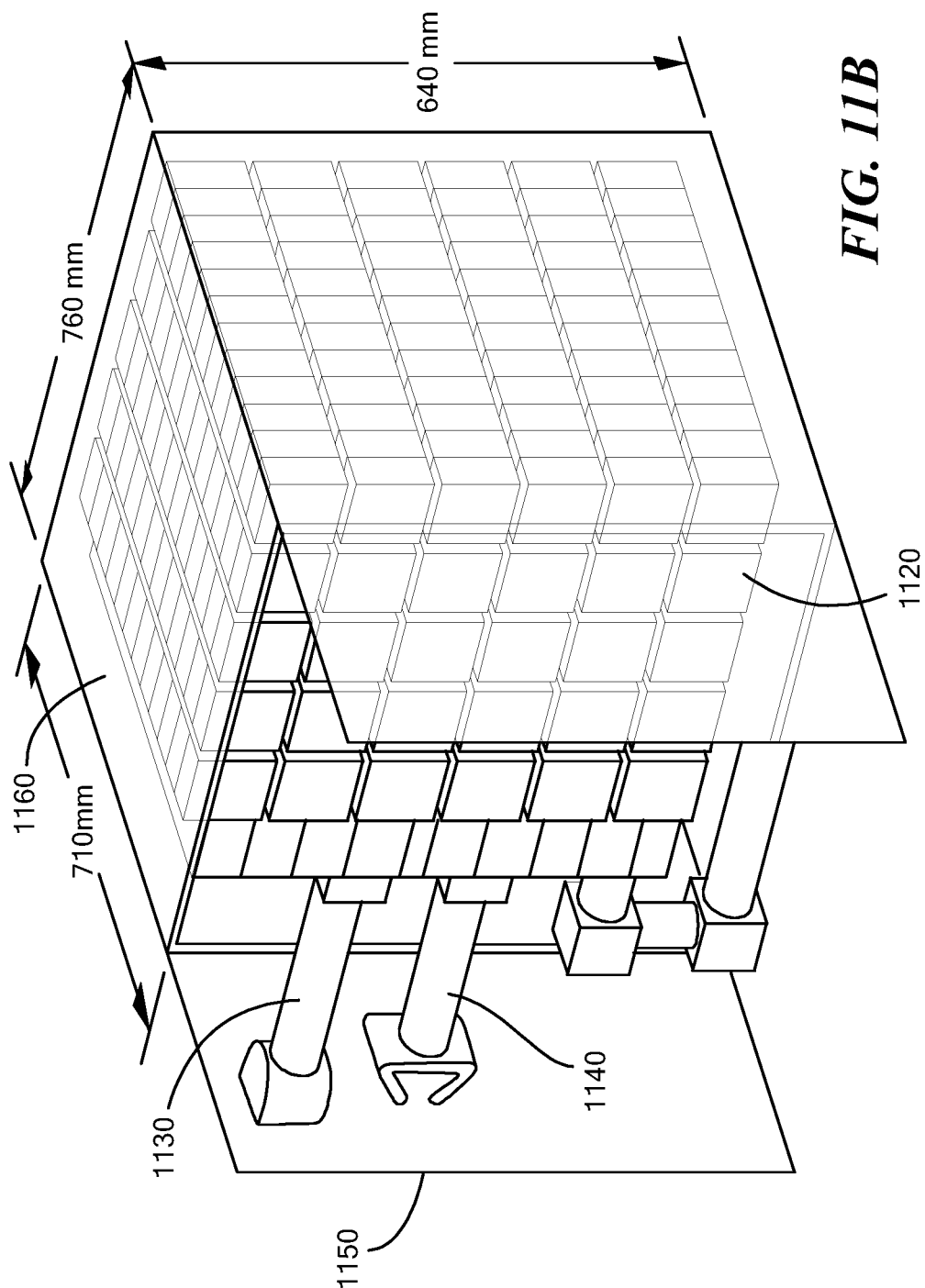

UNMANNED SPACECRAFT AND METHOD FOR ASSEMBLING SATELLITES

CROSS-REFERENCE TO RELATED APPLICATIONS

This application claims benefit of U.S. Provisional Patent Application Ser. No. 63/112,136, the contents of which is incorporated by reference herein in its entirety.

FIELD

One or more embodiments described herein relate to satellite assembly.

BACKGROUND

As outer space (i.e. regions above the Earth's surface beginning, for example, at about 62 miles above sea level) becomes more accessible, there is a lack of affordable on-demand capability to address multiple government and commercial constellation tasks for in-orbit servicing and assembly. The first satellite life extension vehicle, Mission Extension Vehicle-1 (MEV-1) by Northrop Grumman, completed docking to a client satellite (Intelsat IS-901) on Feb. 25, 2020. MEV-1 is designed to dock to geostationary satellites having nearly depleted fuel and does not make use of robot arms for an in-orbit servicing mission.

SUMMARY OF THE INVENTION

Described is a spacecraft configured be deployed in outer space and configured to hold unassembled satellite parts and configured to assemble the parts into one or more functional (i.e. operational) satellites (e.g. CubeSats) while in outer space. The spacecraft is also configured to deploy one or more assembled satellites in outer space. Thus, since the spacecraft structure are configured to both hold (or store) satellite parts and assemble the so-stored satellites parts into one or more functional satellites (e.g. CubeSats), the spacecraft structures described herein are sometimes referred to as a "satellite lockers" (i.e. a free-flying satellite locker) capable of assembling and deploying satellites in outer space.

One or more embodiments described herein provide a robotic system and method for assembling functional satellite components in an unmanned spacecraft while the spacecraft is deployed in a microgravity environment In accordance with one or more embodiments, an unmanned spacecraft includes a housing with a door deployed in a microgravity environment; a storage area, in the housing, configured to store parts of a satellite; a first robot movably positioned in the housing adjacent the storage area; an controller configured to control the first robot to move to access parts from the storage area and to assemble the parts on an assembly platform and to control deployment of the assembled satellite through the door of the housing to a position in the microgravity environment.

In accordance with one or more embodiments, a method of assembling a satellite includes (a) receiving information to assemble a satellite from a host system; (b) controlling a first robot to move to access parts from a storage area; (c) controlling the first robot to assemble the parts to form the satellite; and (d) controlling deployment of the assembled satellite to a position in a microgravity environment, wherein the storage area, the first robot, a communication system for performing (a), and a controller for performing (b) to (d) are located in a housing of an unmanned spacecraft deployed in the microgravity environment and wherein (d) includes deploying the assembled satellite through a door of the housing.

BRIEF DESCRIPTION OF THE DRAWINGS

FIGS. 11A and 11B are perspective diagrams of an example CubeSats (or CubeSat components) stored for transport or stowed in a system housing.

DETAILED DESCRIPTION

Embodiments described herein provide a system remotely deployed for use in a microgravity environment for automatically assembling satellites that perform various tasks. In some implementations, the system is, in effect, an unmanned automatic satellite-building factory deployed in space. The system may itself be considered a spacecraft, and the satellites may be various types for performing science, communications, and/or other applications. On a smaller scale, examples of the satellites include CubeSats. In other cases, the satellites may be spacecraft and other types of space-based structures. Thus, in general overview, described is a spacecraft configured be deployed in outer space and configured to hold unassembled satellite parts and configured to assemble the parts into functional satellites (e.g. CubeSats) while in outer space. The spacecraft is also configured to deploy such assembled satellites in outer space. Thus, since the spacecraft structure are configured to both hold (or store) satellite parts and assemble the so-stored satellites parts into functional satellites (e.g. CubeSats), the spacecraft structures described herein are sometimes referred to as a "satellite lockers" (i.e. a free-flying satellite locker) capable of assembling and deploying satellites in outer space.

Figure 1:
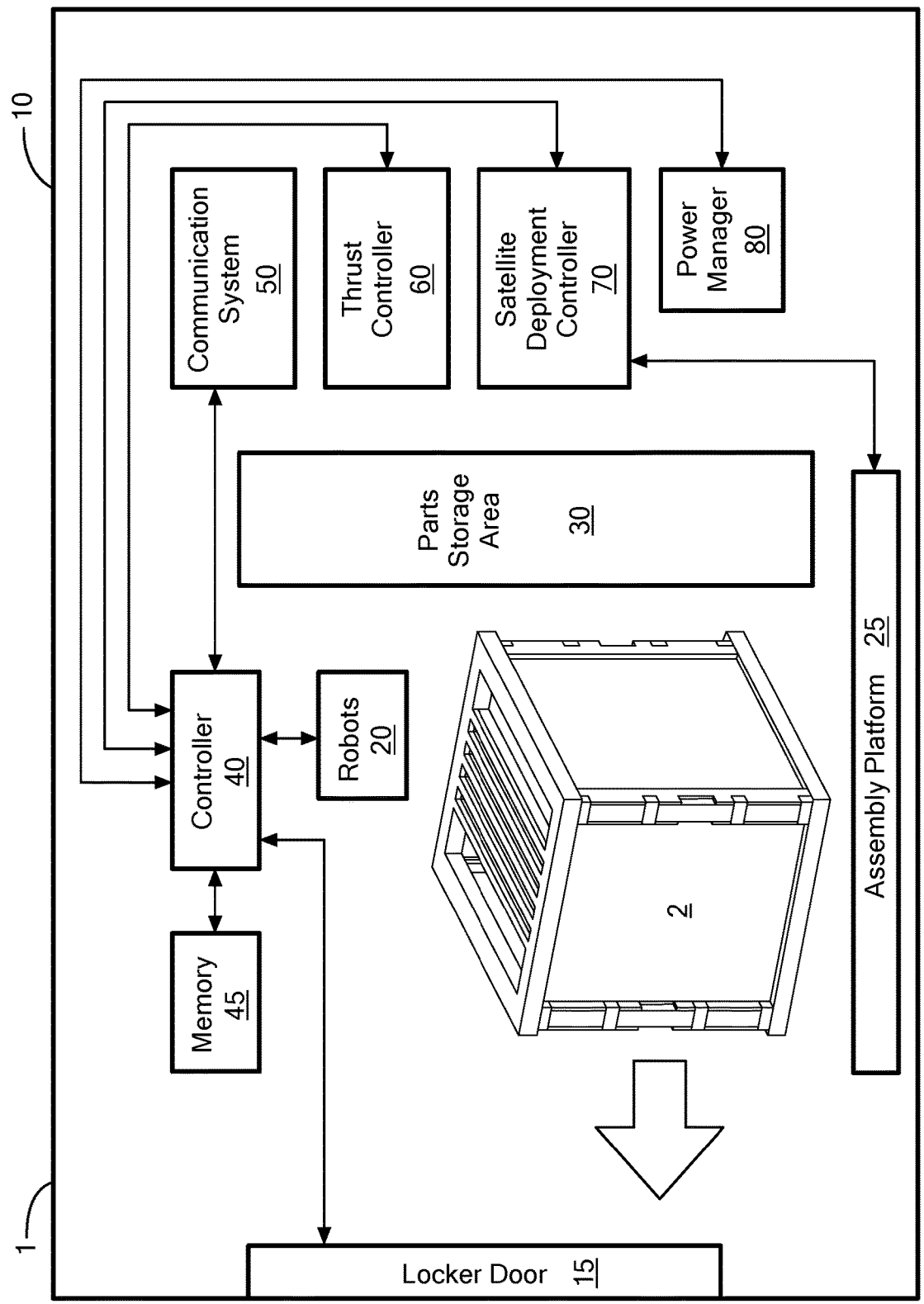
FIG. 1 is a block diagram of an embodiment of an unmanned system for assembling a satellite in a microgravity environment.

FIG. 1 is an example embodiment of an unmanned system 1 (or satellite locker 1) for storing satellite parts and automatically assembling the parts into a satellite (i.e., system 1 assembles parts to build a satellite). System 1 includes a housing 10 having one or more locker doors 15, at least one robot 20, a parts storage area 30, and a controller 40 which may, for example, be configured to control at least one or the one or more robots 20 and/or at least one of the one or more locker doors 15. As noted above, the housing 10 may be called a locker in some embodiments and may be made from a material equipped for deployment in a microgravity environment, which, for example, may be an intended orbit or other position in space. Examples materials from which the housing may be provided include, but are not limited to, metals, polymers, and/or insulation materials for withstanding expected conditions in orbit. The insulation material may protect the electronics and other items within the housing from extreme cold, radiation, and/or other environment conditions.

As noted the housing 10 may include one or more locker doors 15 (with only one locker door visible in the example embodiment of FIG. 1) that opens and closes (here via hinges) to allow an assembled satellite 2 to be ejected or otherwise deployed to a predetermined location. It should be noted that in embodiments, neither the satellite parts nor the assembled satellite 2 are properly a part of system 1. The size of the door may be larger (in terms of area) than the assembled satellite in order to allow the satellite to exit housing 10. The one or more locker doors 15 may be located in any portion of housing to facilitate assembly launch of a satellite to be assemble within the housing. Locker doors 15 may be provided having one or more hinges (either top or side hinges), a roll-up mechanism (i.e. a roll-up door), a slide to side door, a tilt-up/up and over retractable door or any other mechanism which allow a door to open and close. A hinge door design is illustrated in the example embodiment of FIG. 2.

Once assembled, satellite 2 may be directed along a path through the door, for example, based upon a force applied by the robot or other driving or deployment system. The force applied may be sufficient to ensure, for example, that the assembled satellite 2 is deployed at the intended position in the microgravity environment.

The at least one robot 20 may include, for example, a movable robot arm with a predetermined number (e.g., six) of degrees of freedom. The robot may have a base mounted in a stationary or fixed position or may be mounted on a moveable base that moves (or is moved) in one or more directions. The at least one robot 20 may be mounted at a position within the housing that will allow it to grasp all or predetermined types of parts of the satellite 2 stowed in the parts storage area 30. The at least one robot 20 may then be controlled to transfer those parts to at least one assembly platform 25 or region proximate (e.g., below, proximate or adjacent to) the robot 20.

The assembly area is here illustrated as an assembly platform 25 which may be located (e.g. mounted or otherwise located) at a fixed position or may be moveable. In one embodiment, the assembly platform may be movably coupled to one or more rails within the housing. In this case, the platform 25 may move along the rails in one or more directions, for example, during the assembly process (e.g., in order to allow the robot to access various angles to assemble parts of the satellite 2) and/or after the assembly process to deploy the satellite 2 through the locker door 15. In one embodiment, the platform may also rotate relative to the rail(s) to allow for improved angles of access during assembly. In embodiments, the assembly area 25 may correspond to a designated region of the housing (i.e. a region within a space of the housing which does not contact a surface of the housing). In embodiments, the assembly area may simply be a designated region or portion of a floor or other housing surface.

The parts storage area 30 may include one or more racks, shelves, and/or other structures for supporting and/or holding various parts which may be assembled by the robot to build satellite 2. These structures may secure the parts both during transport to the microgravity environment and/or, for example, during space flight (e.g. an orbit around Earth or other celestial body). In one embodiment, the satellite to be assembled may be designed for various applications and perform one or multiple operations/functions. In one embodiment, the parts storage area 30 may store a number of parts sufficient to fabricate or otherwise build one or more of the same type of satellite or one or more of different types of satellites.

The parts of the satellite(s) may be stored in a disassembled or partially assembled state in the parts storage area 30 and then connected or otherwise coupled or assembled together via the one or more robots 20 to effectively manufacture (e.g., assemble or build) the satellite 2 for deployment. The one or more robots 20 are controlled by a pre-programmed controller 40 such that the assembly is automatically performed (i.e., performed by the one or more robots without human intervention). The parts from which the satellites are manufactured or assembled may include, but are not limited to controllers and other types of processing components, sensors, memory, telemetry and communications systems, mechanical parts, frame parts, payload, optics, processing components, specimens or samples, and any additional parts that correspond to fabrication of the satellite as well as those to be used to accomplish its intended purpose.

The satellite(s) may be, for example, be provided as so-called CubeSat type satellites designed to have one or more desired purposes. These purposes may include various types of experimentation and research endeavors, imagery acquisition, navigation and positioning, communications, weather-related applications, various types of sensing, exploratory functions and biological and pharmaceutical uses. Other types of satellites that may come within the purview of being automatically assembled in accordance with one or more embodiments include nano satellites (or even smaller satellites on a smaller scale) and up to full-sized satellites and space-based structures on a larger scale.

The controller 40 may include all or a portion of the processing logic for controlling the at least one robot 20 to perform assembly of the satellite(s). In one embodiment, the controller may perform these operations based upon instructions stored in a memory 45, which, for example, may be any type of non-transitory computer-readable medium for storing instructions to be executed by at least one processor, e.g., the controller 40. The instructions may include step-by-step instructions indicating a part assembly sequence which results in assembled satellite 2.

The instructions may also control activation of batteries (and/or other power sources) of the satellites, assembly and activation electronics of the satellites, payload initiation and control, etc. Such controller instructions may be carried out, for example, by the at least one robot under control of the controller 40 or may include, for example, activating various features of the modular parts (e.g., electronics or other parts) stored in the storage area 30. In one embodiment, activation may be performed based on one or more control signals and/or data input into the satellite components by the controller.

The memory 45 (or another data storage device in housing 10) may also store various types of data and/or instructions relating to operation of the system, as well as data relating to assembling and deployment of the satellites. The data may include orbit-related positioning of the system so that the satellites may be delivered to a desired position in the microgravity environment, e.g., space. This may also include power management operations for the system, communications instructions and schedules, and other operationally related control features. In one embodiment, the system 1 may include more than one robot. In such a case, controller 40 may control all of the robots or the robots may be controlled by separate controllers collectively referred to as controller 40 or as otherwise indicated herein.

The system 1 may include a number of other features. For example, the system may include a communication system 50 (e.g. comprising a transmitter and a receiver) for receiving information from and/or transmitting information to a base station, space station, or Earth-based control (or host) system. The communication system may receive instructions for the system 1 to assemble a specific type of satellite and then to deploy that satellite at a designated position in the microgravity environment. In one embodiment, the received instructions may initialize and/or make certain modifications to satellite assembly. When system 1 is equipped with a propulsion system, communication system 50 may receive commands for the system 1 to move to a certain space-based location and/or to rotate or otherwise move to or assume a certain orientation. The controller 40 may then execute the instructions and commands, as well as control transmission of data relating to assembly and/or other information through the communication system.

A thrust controller 60 may control the propulsion system of the system 1. The thrust controller may receive instructions (e.g., from controller 40) to move system 1 to a predetermined location, for example, as pre-programmed or based on instructions received through the communication system 50. Examples of the propulsion system are discussed below.

A satellite deployment controller 70 may control the locker doors 15 to eject (or deploy) a newly assembled satellite 2 into position in space. In one embodiment where, for example, the assembly platform is movable such as along one or more rails, controller 70 may control a drive chain or other type of driver to advance the platform toward the locker doors 15 and release or apply a force to push the satellite 2 into outer space (or more simply "space") through the open door.

A power manager 80 may include one or more power sources for powering the robot and other features of the unmanned satellite assembly system 1. The power sources may include, for example, one or more batteries and/or an arrangement of solar panels. Based on power from these power sources, sufficient power may be provided to ensure assembly of robots for at least a predetermined continuous duration of operation, as well as to power control of the other features of the system. In FIG. 1, the power manager 80 is shown coupled to controller 40. In this case, controller 40 may operate as a distributor of power to the various portions of the system so as to allow various functions to be performed. In other embodiments, the power manager may bypass controller 40 to directly power the functions of the system.

The automatic satellite assembly system 1 of FIG. 1 may therefore be described as an in-orbit robot arm system that rapidly assembles and deploys satellites in substantially less time than it takes for satellites to be assembled on Earth and then launched into space. In one application, the system may be used to provide an unparalleled number of small satellite configurations (i.e., the system may be used to assemble and then deploy satellites for scientific, commercial, and other uses for operation in a predetermined orbit). Examples of such an orbit include, but are not limited to, a Low Earth Orbit (LEO) and a geostationary orbit (GEO). Examples of other locations include polar and International Space Station (ISS) locations.

In one embodiment, the system may automatically assemble a modular CubeSat and COTS-based robotic assembly. In such a case, implementation of the system could break reliance on high-risk, high-latency, high-cost legacy space hardware. For example, rather than develop a new custom spacecraft, one or more embodiments provide a simple payload quick return (SPQR) automatic satellite assembly system as a spacecraft to transport robot arm(s) and satellite (e.g., CubeSat) components to a predetermined location.

Figure 2:
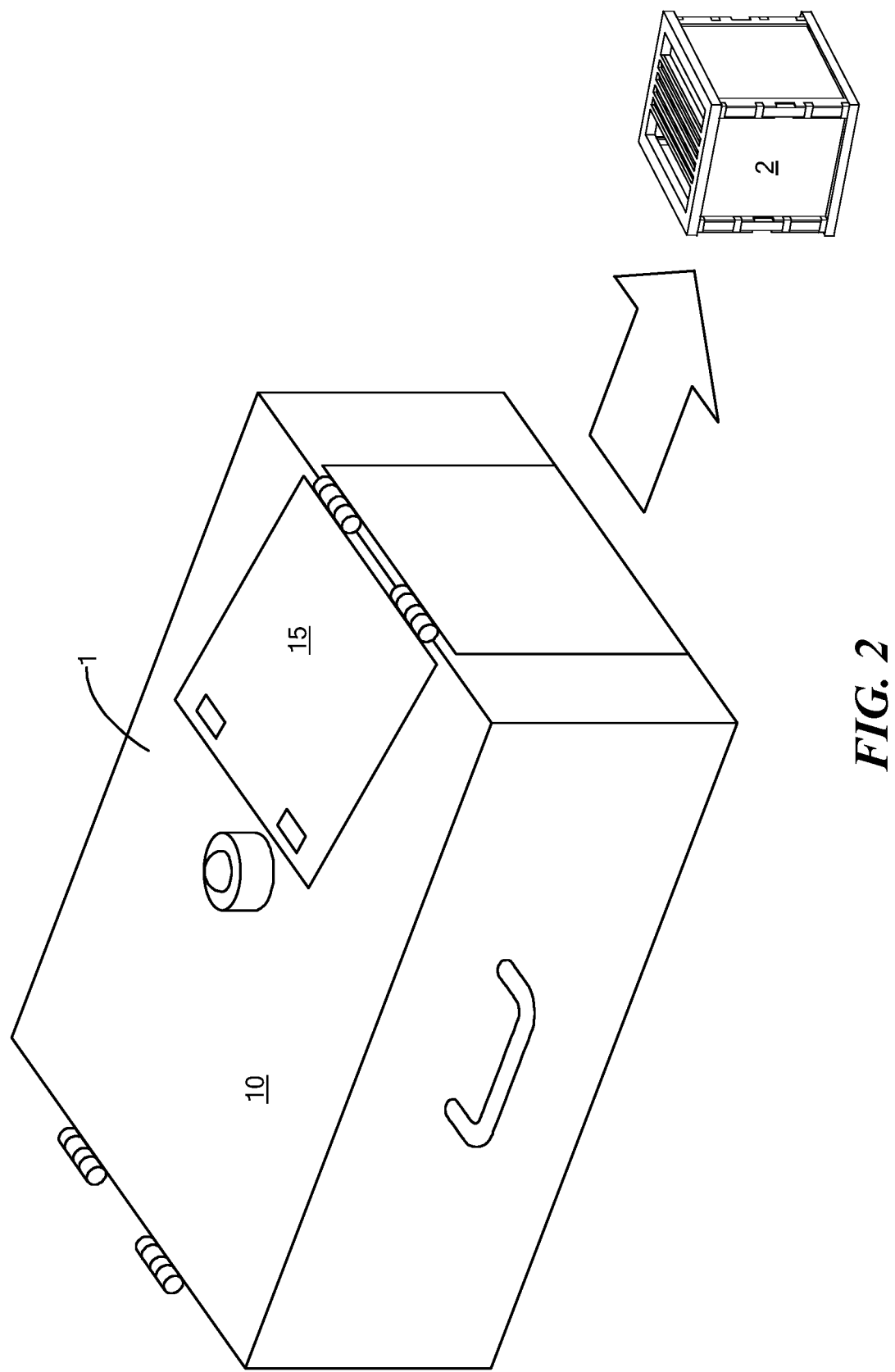
FIG. 2 is a perspective view of an example satellite assembly system implemented in a simple payload quick return (SPQR) system.

FIG. 2 is a perspective diagram of system 1 where the housing (or locker) 10 of the system is implemented as a low-cost system having a predetermined volume (e.g., 24 in×36 in×12.5 in). In this example, the locker door 15 is open and the assembled satellite 2 is automatically deployed into space. In such an application, use of the ISS volume may be maximized and may be compatible with a small ISS air-lock. The power source for the system 1 may provide power sufficient for a predetermined duration of operation, e.g., at least three months of continuous operation.

In one embodiment, system 1 may have the functionality of a small satellite, which includes basic power, thermal, telemetry, command/control functional elements as described above. Small body-mounted solar arrays may provide adequate power, either as a principle or supplementary power source. In some cases, the power source(s) of system 1 may not be able to provide sufficient power for a prolonged assembly time. Therefore, in one embodiment the assembly time for each satellite may be pre-programmed to be a predetermined maximum time, e.g., 30 minutes.

In one embodiment, the satellite 2 may be housed in an enclosure within a linear tube mechanism. In such an embodiment, most of the volume may correspond to two empty bays, which houses a Tube Deployed Re-entry System (TDRV). The deployment system may include an electrically actuated latch, which permits a spring-loaded piston to eject (or deploy) a particular device and/or the satellite 2. Such an arrangement may be controlled, for example, by the satellite deployment controller 70 previously discussed.

To reach orbit, the SPQR system may be launched in soft-stowage in a cargo flight (e.g., Cygnus Northrop Grumman (NG)-12 mission and the SpaceX Commercial Resupply Service (CRS)-16 cargo flight) to the ISS, and may fit within the maximum size of an object passing through the ISS Airlock.

Figure 3:
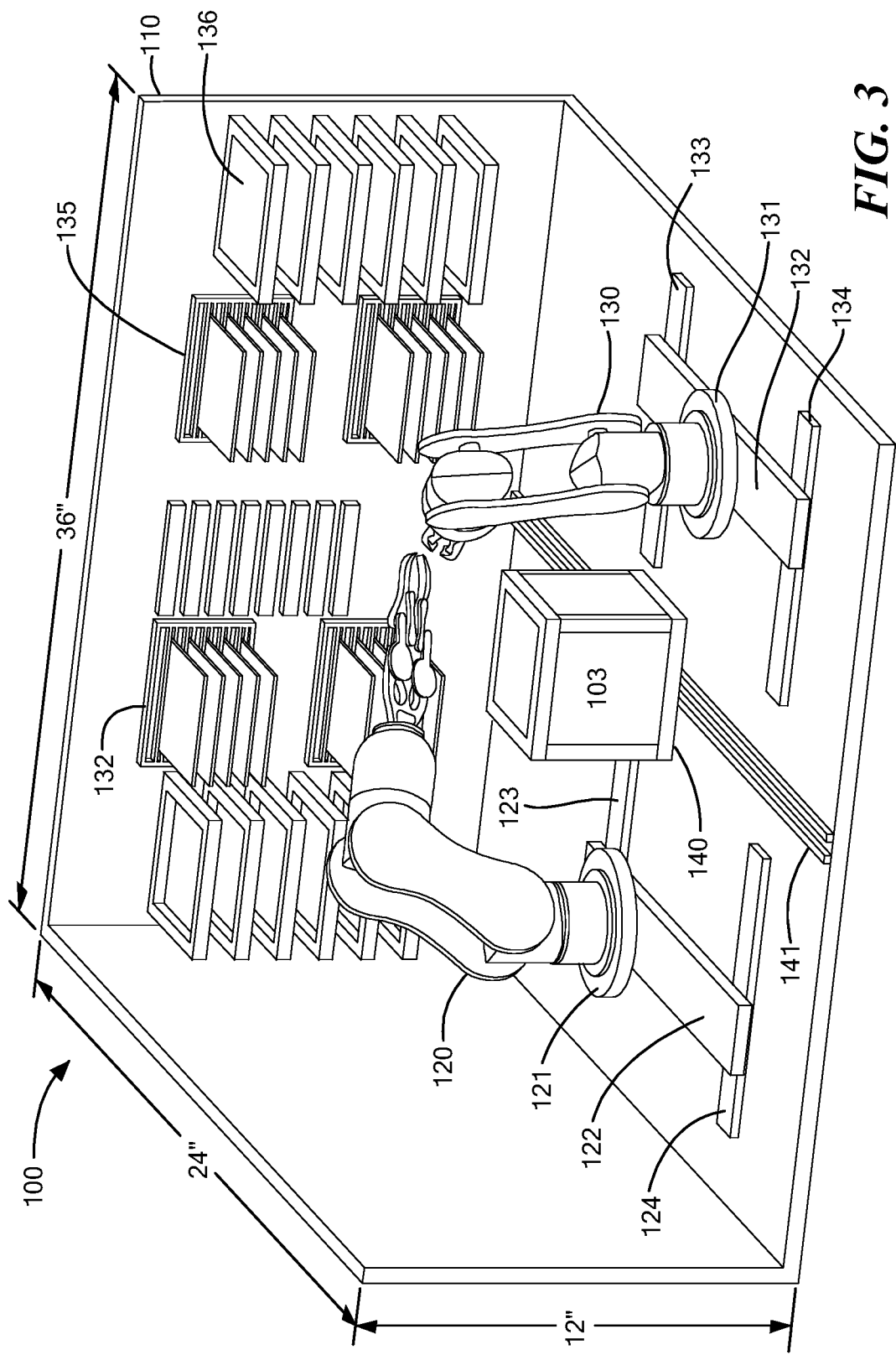
FIG. 3 is a perspective sectional view of an embodiment of an automatic satellite assembly system which includes two robot arms.

FIG. 3 is a perspective sectional diagram of an embodiment of an automatic satellite assembly system 100. The system 100 may share many of the same features as system 1 of FIG. 1, except system 100 may include two robot arms 120 and 130. The robot arms may be operated (e.g., by controller 40) independently and/or in synchronization depending, for example, on the assembly operation being performed. Designing all or a portion of the satellite parts as functional modular components may increase integration of the assembly process, especially in terms of efficiency and activation.

Referring to FIG. 3, a system 100 (or satellite locker 100) includes a housing 110 having disposed therein one or more robots (with two robot arms 120 and 130 being shown in this example embodiment) and a storage area 135 configured for storage of individual parts of the satellite 103 to be assembled (e.g., frame parts and other structural features, modules, components, electronics, etc. from which a satellite may be assembled). As stated, in one embodiment, all or a portion of these parts may be modular in design to allow for improved efficiency during assembly. The housing 110 has a predetermined enclosed volume with at least one access point or door (e.g., door 15) as previously described. Example dimensions are given but these dimensions may be different in another embodiment.

In this embodiment, a controller (e.g., controller 40 in FIG. 1) may control and synchronize operation of the robot arms 120 and 130 to grasp parts from the storage area and assemble such parts on a platform 140. The platform may be moveable (for example, rotationally, linearly and/or along various axes or paths) in order to allow for proper orientation during assembly and/or for deploying the assembled satellite through the door of the housing into a designated position in the microgravity environment. In one embodiment, the platform 140 may be movably mounted on one or more rails 141 aligned with the door of the housing. In FIG. 3, the satellite is depicted as a CubeSat but may be another type of satellite or structure in another embodiment.

The storage area 135 includes a plurality of shelves 136 and compartments or racks 132 to store the parts to be assembled. The number and types of parts correspond to at least one type of CubeSat. In other embodiments, the number and types of parts may be sufficient for assembly of a plurality of the same or different types of CubeSats. The parts in the storage area may be inserted in a manufacturing center prior to launching the system 100 into space.

Each of the robot arms 120 and 130 may be mounted on a rotating platform 121 and 131, respectively. The rotating platforms may rotate the orientation of the robot arms into positions for satellite assembly. The rotating platforms 121 and 131 may be mounted on support platforms 122 and 132, which in one embodiment may allow the robot arms to move in a first direction, e.g., in a direction substantially parallel to the rail 141 on which the satellite assembly platform moves. The support platforms may be mounted on respective pairs of rails 123/124 and 133/134. The rails allow the robot arms to move in a second direction, e.g., a lateral direction substantially perpendicular to the first direction. Through these various degrees of freedom, the robot arms may assume various positions for assembling a satellite.

In one embodiment, the housing 110 may include a thermal management system for controlling the thermal conditions within the housing and particularly the modular and other parts in the storage area which could become damaged or otherwise malfunction in harsh temperatures. Additional features include an exo-brake used, for example, to satisfy end-of-mission requirements. In such a case, the exo-brake may have a low ballistic coefficient (e.g., ~1 kg/m$^2$) to effect rapid de-orbit. In one embodiment, the exo-brake may be deployed to slow down the system and cause it to lose altitude. The exo-brake may then disintegrate upon atmospheric re-entry, which may be a predetermined duration (e.g., approximately 36 weeks) after deployment into the microgravity environment. If the exo-brake fails to deploy, the system may be controlled to re-enter the atmosphere for an additional number of weeks, e.g., a total of 247 weeks after deployment.

The controller 40 may be implemented in a variety of ways. In one implementation, the controller 40 may include a radiation-tolerant Raspberry Pi 4 on-board computer, a Wireless Sensor Module (WSM) ESP32, and the SHR/UHR hazard set (ISS set). The Raspberry Pi 4 on-board computer may use, for example, an 8-bit PIC microprocessor with flight heritage including the SOAREX-8, GeneSat, and the ATEK/MAPHEUS-8 sounding rocket campaign. In one embodiment, all of the processing elements (e.g., robot(s) controller(s), propulsion system controller, deployment controller, printed circuit boards, etc.) of system 100 may be collectively referred to as controller 40 or only some of the processing elements may correspond to this controller.

In this embodiment, the component parts of the CubeSat are assembled by two dexterous robots 120 and 130 and deployed into the microgravity environment. In one example implementation, the mechanical structure of the CubeSat may include two polyetherimide (PEI) 3D-printed base and top covers and two robot arms with six PCBs (Printed Circuit Boards, which may also correspond to the controller 40) snapped into the covers with or without magnets. Such an arrangement may make it possible to assemble the satellite in a relatively short period of time. When deployed, the functionality of the CubeSat may be verified, for example, at the ISS or other host system when the communications system of the CubeSat is enabled. The boards and other structures and components of the CubeSat may be manufactured on Earth and flat-packed for launch. In one embodiment, the CubeSat may be deployed into a sun-synchronous polar orbit for three reasons: such an orbit provides consistent lighting of the Earth-scan view, such an orbit permits good ground resolution, and such an orbit may allow the CubeSat to conduct an Earth-observing mission as one of its initial missions.

Figure 4:
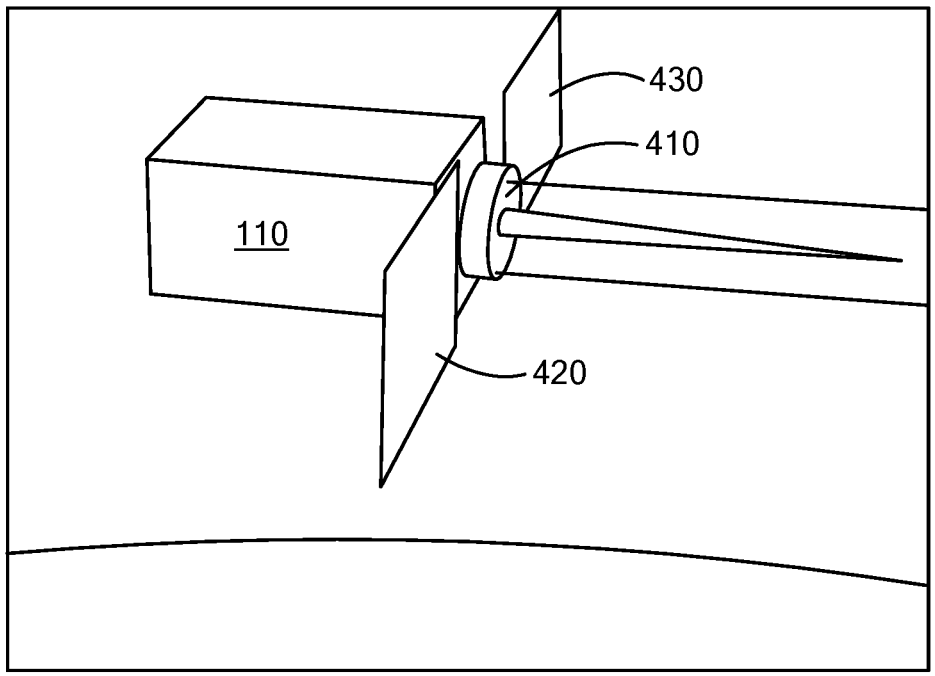
FIG. 4 is a perspective view of an embodiment a satellite assembly system that includes a propulsion system.

FIG. 4 is a perspective diagram of an embodiment where the housing 110 of the system includes a propulsion system (e.g., a thruster) 410. When operated, the thruster 410 may move the system to a predetermined position in the microgravity environment, e.g., to an intended position of a certain orbit. The thruster may be, for example, any of the types of thrusters described herein, such as those which may also be incorporated into one or more embodiments of the assembled CubeSat. In this embodiment, the housing 110 is shown to be equipped with a pair of solar panels 420 and 430 for providing power as previously discussed.

Figure 5:
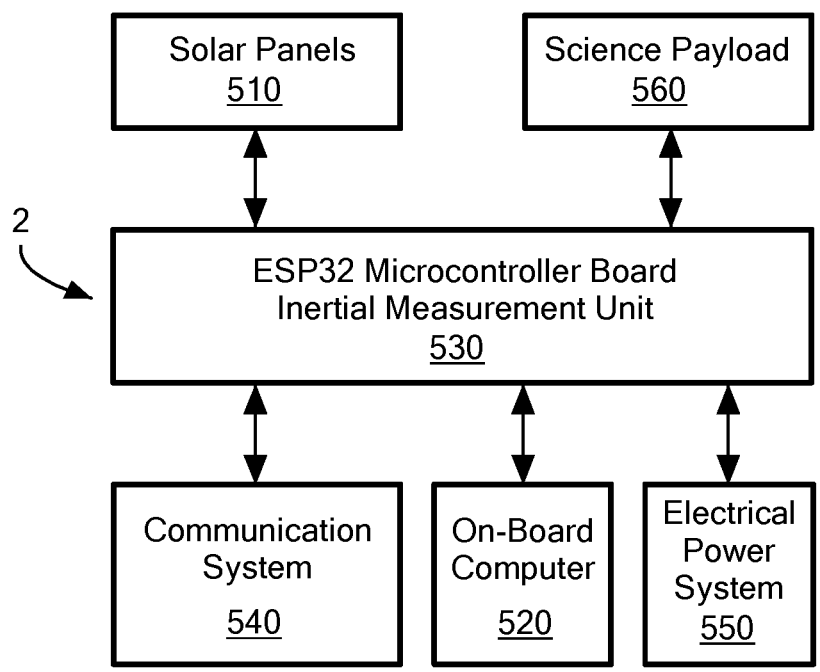
FIG. 5 is a block diagram of an embodiment of a satellite which may be assembled in accordance with the system and method embodiments described herein.

FIG. 5 is a block diagram of an embodiment of satellite 2 which may be assembled in a microgravity environment in accordance with the system and method embodiments described herein. In this embodiment, the satellite includes one or more solar panels 510 serving as a main or auxiliary power source, an on-board computer 520, and a supplemental controller board 530 which may or may not include one or more sensing circuits. One example of controller board 530 is an ESP32 Microcontroller Board and Inertial Measurement Unit, but different control and/or sensing logic may be used in another embodiment. Controller board 530 may communicate all or a portion of the satellite systems and thus may serve as a main controller in some embodiments.

The satellite 2 may also include a communications unit 540, an attitude control system (e.g., passive), and an electrical power system 550, the latter of which may manage power for the satellite. In one embodiment, the electrical power system may include a battery.

The satellite 2 may have various configurations, one example of which is a 1-Unit Cubesat platform that integrates reliable subsystems into a compact form factor that provides high performance and reliability at low cost. The 1 U platform delivers the power, structures, antennas, communications, and on-board computer required to serve its intended use. The power, control, computing, and radio communication tasks of this embodiment of the 1 U CubeSat may be available to a science payload 560. The science payload may, for example, pass its data through the microcontroller 530 and then onto the communication system 540 for downlink.

When employed as a CubeSat, satellite 2 has a predetermined number of sides. In the example of FIG. 3, the CubeSat 102 has six sides (only three of which are visible in FIG. 3).

In the example of FIG. 3, the locker 110 has six sides (only three of which are visible in FIG. 3 since three sides have been removed to reveal structures internal to locker 110). In one embodiment, five of the six sides of housing 110 may be covered with solar panels and the sixth side may include a door or other opening or access point through which an assembled satellite may be deployed. The solar panels may include, for example, two triple-junction gallium-arsenide (GaAs) solar cells directly exposed to the external space environment. Each of the solar cells may be separated by four window slots through which polymer test samples, a radiation sensor, RBF pin, and diagnostic ports may protrude. A power/radio/battery unit may be on one side and the solar cells may be connected to provide power (e.g., 3.5 V, 0.4 A, 1.4 W) into a boost circuit that charges two lithium-polymer (LiPo) 7.4 V batteries to a total capacity of 4.4 Ah. The Z+ side may have both transmitter and receiver radio patch antennas for Globalstar. The Electrical Power Subsystem (EPS), communications unit, and the on-board computer may be physically co-located, for example, by one or more boards.

In one embodiment, the printed circuit board for the payload may use an ultra-low-power MSP430 microcontroller "LaunchPad" development daughterboard, containing radiation-tolerant, non-volatile ferroelectric random-access memory (FRAM). The board may be connected to the microcontroller, providing shared control, data processing/buffering, and radio communication to the science boards in a round-robin fashion. The payload and the microcontroller may be mounted to the back of the solar array boards (which face the outside of the satellite).

The solar array boards may include cutouts of a predetermined area (e.g., 32 mm×9 mm) that allow sensors (such as a camera) to be exposed directly to space. The solar array boards, circuit boards and/or other contents of the locker may be packaged on Earth (e.g. arranged in a flat-packed or other packaging arrangement) before being snapped or otherwise disposed or secured into place in the system housing, or locker, by the robot(s). This approach may reduce (and ideally eliminate) the need for screwdrivers, keysets, wrenches, pliers, hammers, and other tools which may otherwise be required to assemble a structure. In embodiments magnets maybe used as fasteners when the satellite is robotically assembled in-orbit (thereby reducing or ideally eliminating the need for fasteners, such as screws or rivets for example). All subsystems boards may be routed through connectors which line the structure to the microcontroller. In one embodiment, these connectors may provide a common connection point for all boards to aid functionality. This configuration is important for satellites (e.g. CubeSats) having multiple payloads. It allows the microcontroller to provide payloads with equal access to the on-board computer, EPS, and communication.

Table 1 shows example specifications for a robotically 1 U CubeSat which may be assembled in accordance with one or more embodiments. In this CubeSat, the controller (e.g., embedded microprocessor) may execute (or "run") flight software, communication system (e.g., digital communication system protocols), electrical power system(s), and passive thermal observation system, in addition to the robots. In another embodiment, a different controller may operate (or "run") the robots to assemble the satellite(s). The data may be routed through the embedded routing connectors within the structure, which provide up to 2.5 W of power at 3 V and 5 V.

TABLE 1

| | |
|---|---|
| Volume | 1U |
| Mass | 1000 g |
| Attitude Capability | Detumbling |
| Data bus | I2C/RS 232 |
| Storage | 2 × 2 GB |
| Average payload power | 400 mW |
| Power bus | 3.3 V/5 V (2 A max) |
| Uplink | 9.6 kbps (VHF) |
| Downlink | 9.6 kbps (UHF) |

Figure 6B:
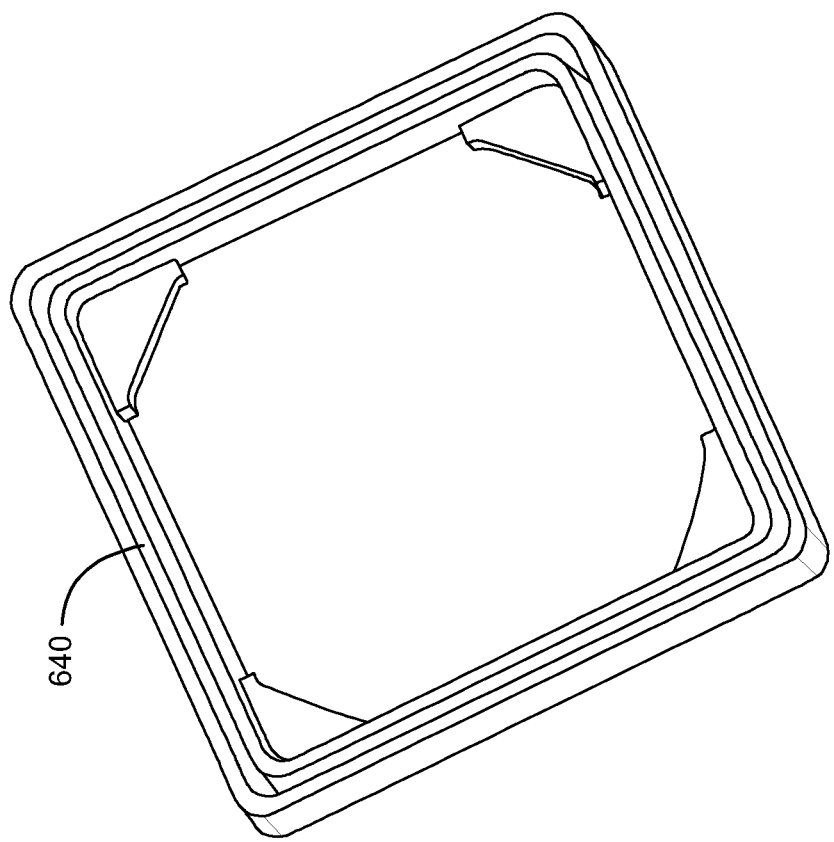
FIGS. 6A to 6D are perspective diagrams of different CubeSat parts configured such that they may be assembled by one or more robots into an illustrative CubeSat system.
Figure 6A:
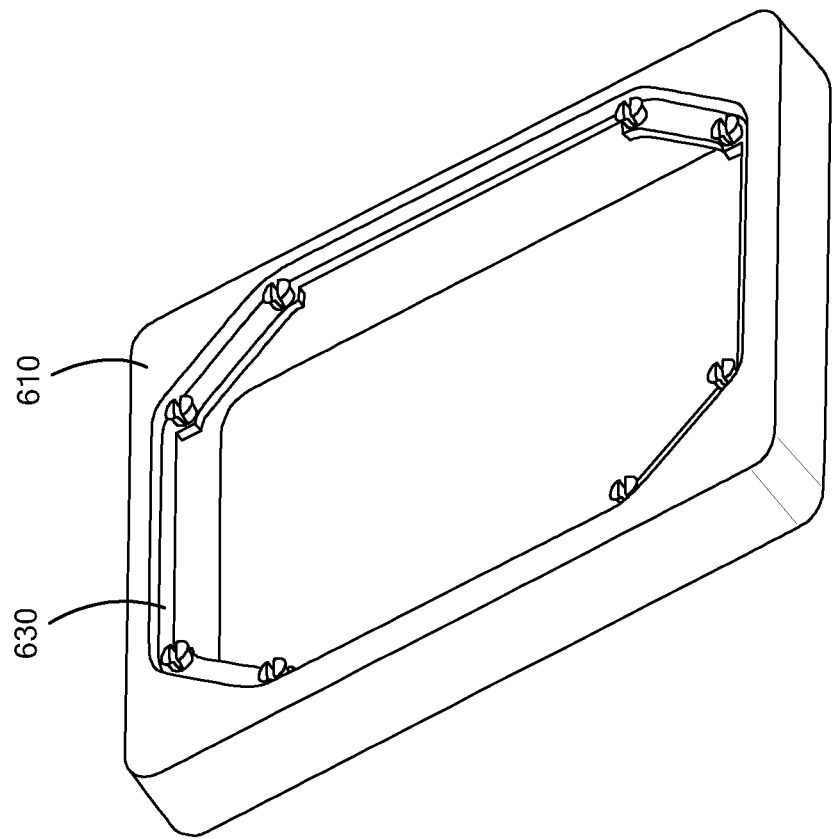
Figure 6D:
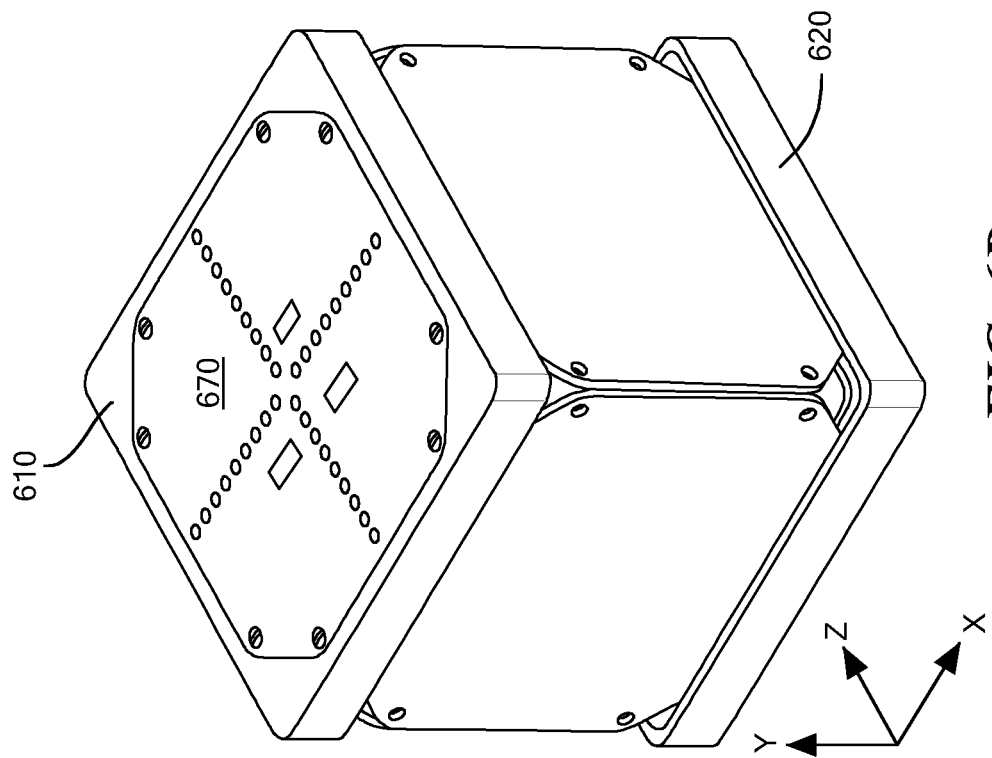
Figure 6C:
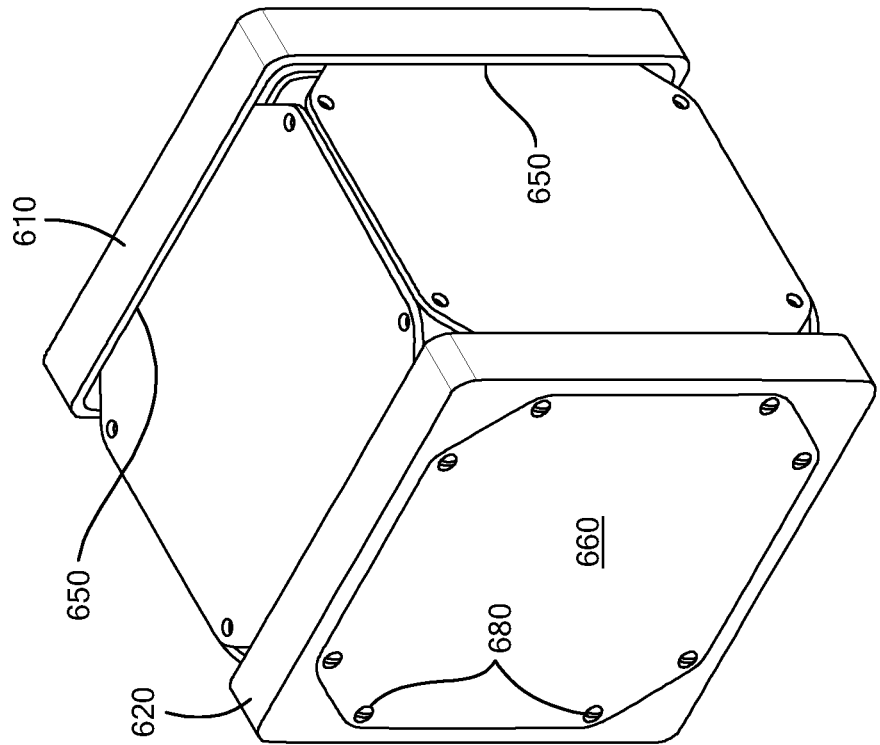

FIGS. 6A to 6D are perspective diagrams showing different parts of a CubeSat structure that may be assembled by the robot(s) of the system. This structure includes an upper latch frame 610 and a lower latch frame 620 which, for example, may have a similar structure. As shown in FIG. 6A, the outer surface of each of the upper latch frame and the lower latch frame (only upper latch frame 610 shown) has an inner recessed surface 630 having a predetermined shape. As shown in FIG. 6B, the inner surface of each of the upper latch frame and the lower latch frame (only upper latch frame 610 shown) may have a circumferential groove 640. During assembly, the robot(s) insert edges of panel boards 650 into the opposing grooves of the upper and lower latch frames at predetermined positions (or sides). In one embodiment, the edges 650 may snap into the grooves or otherwise be held in place by a friction fit or other type of fastener. As shown in FIG. 6C, the robot(s) may then attach boards 660 and 670 into the inner recessed surfaces 630 of the upper and lower latch frames, which, for example, may be secured by screws 680 or another type of fastener. In one embodiment, one or more of the boards of the CubeSat may be coupled together by magnets. In addition to the modular design of the CubeSat components, the use of magnets as fasteners may improve the efficiency of assembly of the satellite and alleviate the need to screw or otherwise use mechanical fasteners for this purpose. In addition, as shown in FIG. 6D, board 670 may include various features such as, but not limited to, one or more sensors to perform an intended application of the CubeSat.

Figure 7B:
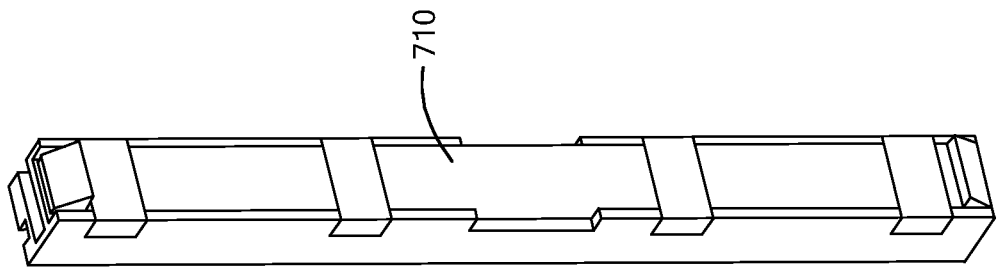
FIGS. 7A and 7B are perspective diagrams of different parts of another illustrative CubeSat structure that may be assembled by one or more robots into an illustrative CubeSat system.
Figure 7A:
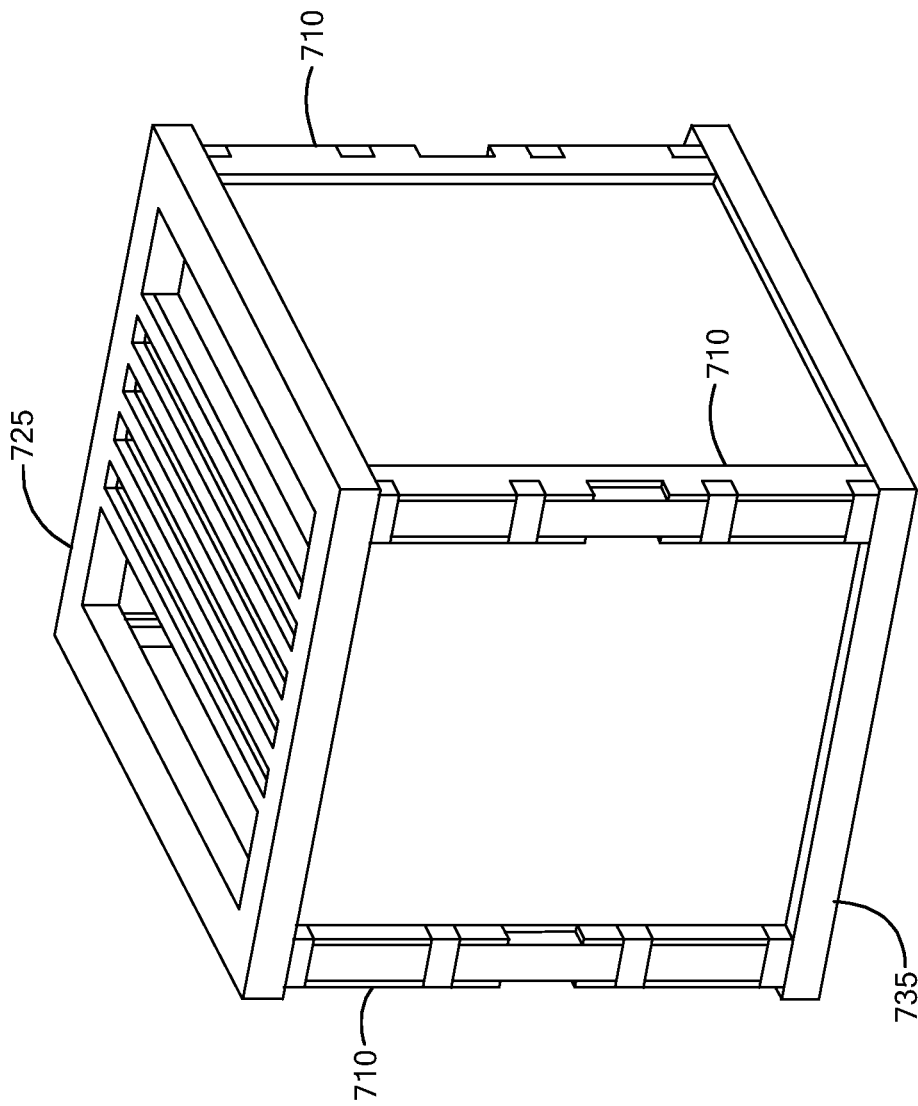

FIGS. 7A and 7B are perspective diagrams of another example of a CubeSat structure that may be assembled by the robot(s) of the system. This structure includes a plurality of rails 710 that are fixed to the corners along the sides of the satellite. One of the rails is shown in isolation in FIG. 7B. The rails may be rigid structures that span between upper and lower latch frames 725 and 735 of the CubeSat to fortify the strength of the CubeSat. The upper and lower frames may be different from the upper and lower latch frames of the CubeSat in FIGS. 6A to 6D, for example, in terms of sensors or features characteristics, or may be the same as the upper and lower latch frames in FIGS. 6A to 6D. Otherwise, this CubeSat structure may have a structure similar to the example shown in FIGS. 6A to 6D.

Figure 8A:
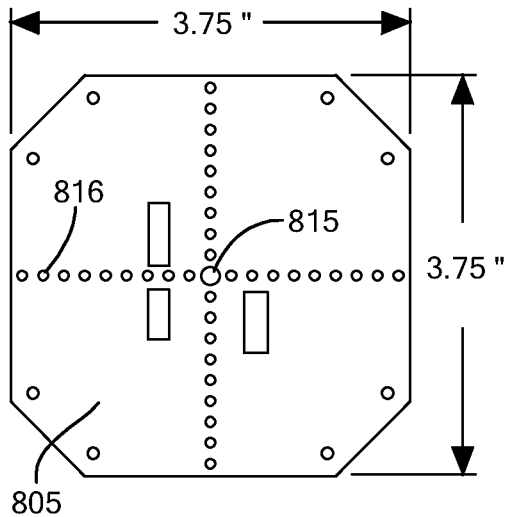
FIGS. 8A and 8B are top views showing opposing sides of a printed circuit board that may be used in one example of an assembled satellite.
Figure 8B:
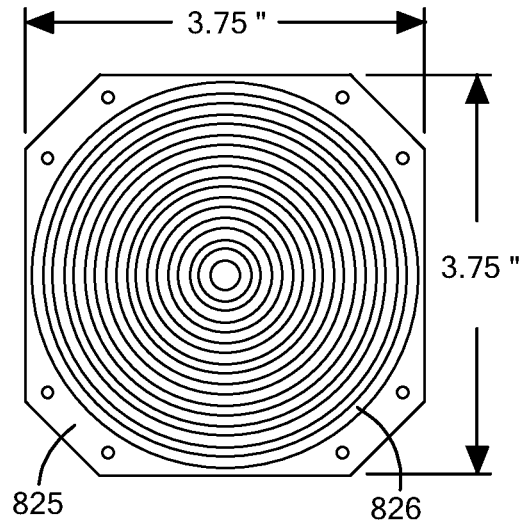

FIG. 8A is a perspective diagram of a front side 805 of a circuit board 810 and FIG. 8B is a perspective diagram of a back side 825 of the circuit board 810 that may be used in one example of an assembled CubeSat. The board may be customized depending on the intended application. Such customization may include, but is not limited to, the addition of electrical/electronic components (e.g. electrical/electronic components which perform a specialized function and/or inclusion of electrical contacts (e.g., so-called "pads") inclusion of mechanical contacts and mechanical features to support or cooperate with other features such as solar panels). For example, the board 810 may be customized to serve as a communications board with corresponding features. For example, in FIG. 8A, the front side 805 of the circuit board may have disposed thereon or otherwise include one or more photodiodes 815 for duplex short-range optical communication for carrying high speed signals. Pads may also be added on the front side of the board along with other features 816 to allow for electrical connection to external boards, solar panels, or various modules. The photodiode(s) may be, for example, LEDs. In FIG. 8B, the back side 825 of the circuit board includes round contacts 826 and various other parts, e.g., optical parts when, for example, the photodiode(s) 815 on the front side of the board are used for communication purposes. In one embodiment, the circuit board 810 may be connected to an external PCB through the aforementioned contacts or pads. Also, a predetermined number of round contacts may optionally be added on the front side 805 of board and/or through-hole pads for pogo pins may be included on either side of the board for carrying power and low speed signals.

Figure 8C:
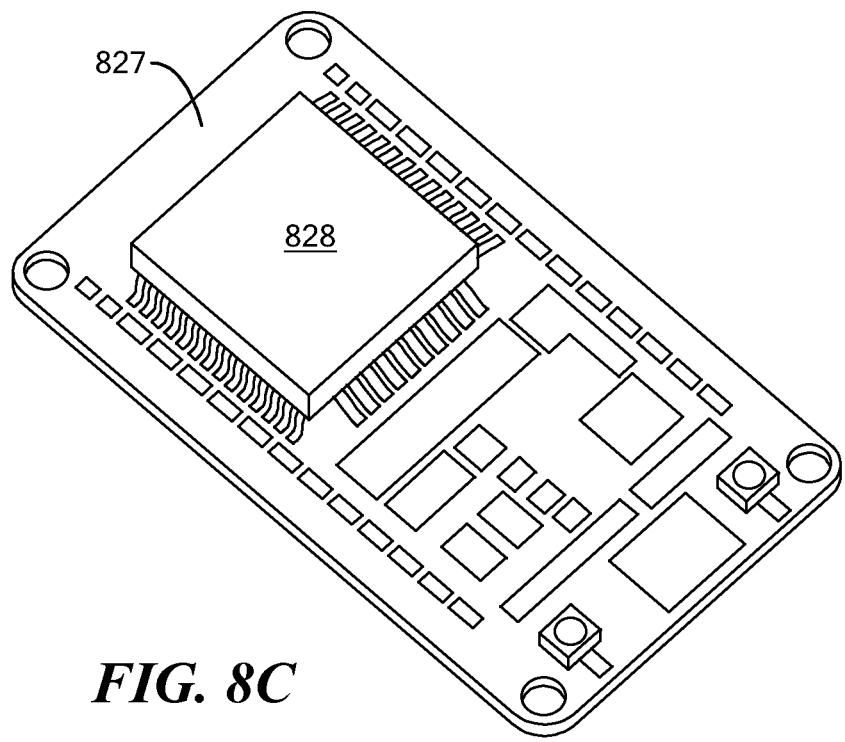
FIG. 8C is a perspective view of a printed circuit board having a microprocessor and other circuitry suitable for use in a CubeSat disposed thereon.

In one embodiment, printed circuit boards (PCB's) such as those described in conjunction with FIGS. 8A-8C, may be used to provide at least a portion of a CubeSat (which, for example, may be modular in nature) may be electrically or communicatively coupled through a microcontroller board (e.g., board 530 in FIG. 5 which comprises a microcontroller or processor) inside the CubeSat.

An example of a microcontroller board 827 including a microprocessor 828 suitable for use in a CubeSat is shown in FIG. 8C. The microcontroller board may serve as a single connection point for all or a select number of boards of the CubeSat. Such a connection arrangement may reduce the probability of assembly errors. For the printed circuit board used for controlling the payload (e.g., 560 in FIG. 5), this board may relay data from itself and/or other boards to a ground station or other host system through, for example, communication system 540. The payload board may also provide computational power, data and signal processing, sequencing control, and/or additional memory.

Examples of components of the CubeSat may be as follows. The computational power may be provided by an ultra-low power MSP430FR6989 microcontroller with 128 kB of FLASH memory for flight code and 130 kB of non-volatile, FRAM (Ferroelectric Random Access Memory) for storing results of computations and signal and data processing results. In one embodiment, the microcontroller board may operate in a peer-to-peer relationship with the on-board computer. The microcontroller can request the electrical power system (EPS) 550 to cycle power the payload to control its duty cycle. The FLASH and FRAM technologies may provide increased resistance to single event errors caused by ionizing radiation. Data is passed from the payload to the microcontroller, which transmits and sends the data to the communication system for transmission to the ground station or other host.

Returning to FIG. 3, the robot arms may be equipped with various tools for assembling the components of the satellite. Examples include welding, mechanical fasteners, adhesives, magnets, or snap-on latches. The magnets may be selected for ease of assembly and weight. In one embodiment, the magnets can be used for passive attitude control. In one embodiment, magnetic fasteners may be used on the additive manufactured structure (and rails along the Z-axis) to produce an assembled CubeSat structure compliant with International Space Station (ISS) CubeSat mechanical specifications.

FIGS. 9A to 9F are perspective diagrams showing a partial sequence of operations performed by one embodiment of a two-robot implementation of the automatic satellite assembly system. In these figures, the operations are shown as being performed at a test facility on Earth, but may be performed in an analogous manner once the system has been deployed in the microgravity environment. The partial sequence of operations are just some of the operations that may be performed in automatically assembling the CubeSat and are given here for illustrative purposes only. Additional or different operations may be performed to fit the configuration of the satellite to be assembled.

Figure 9A:
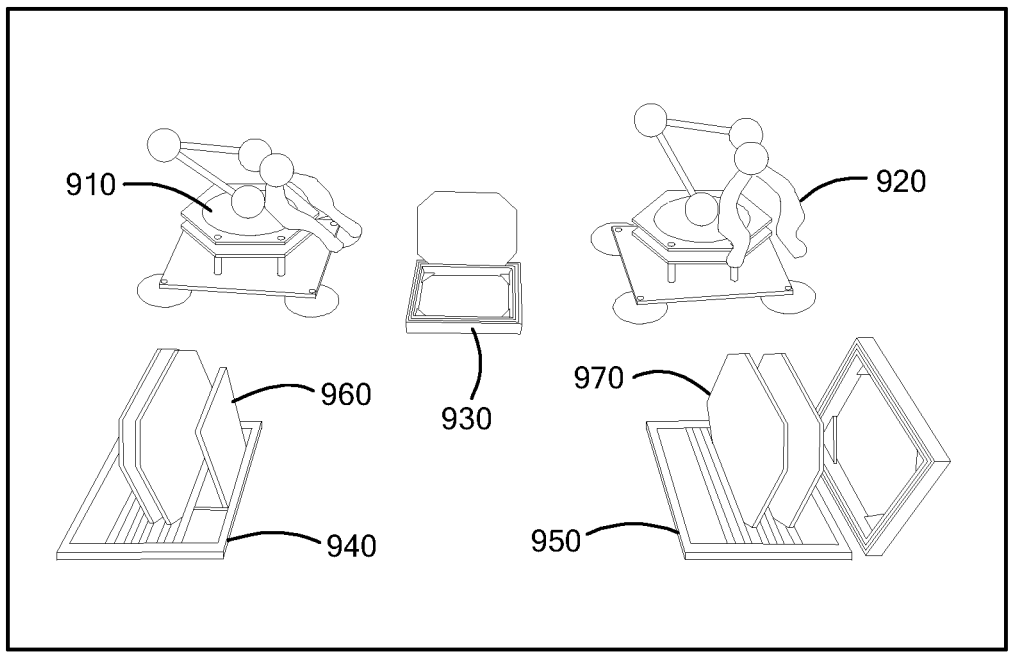
FIGS. 9A to 9F are a series of perspective views of a plurality of modules which illustrate a partial sequence of operations performed by one embodiment of an automatic satellite assembly system.
Figure 9B:
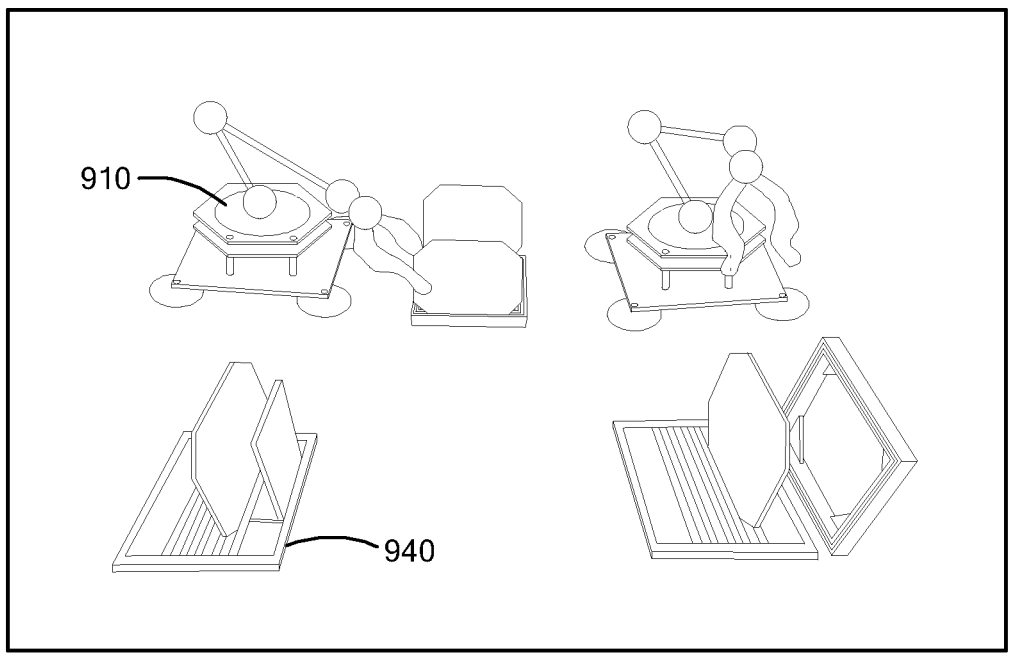
Figure 9C:
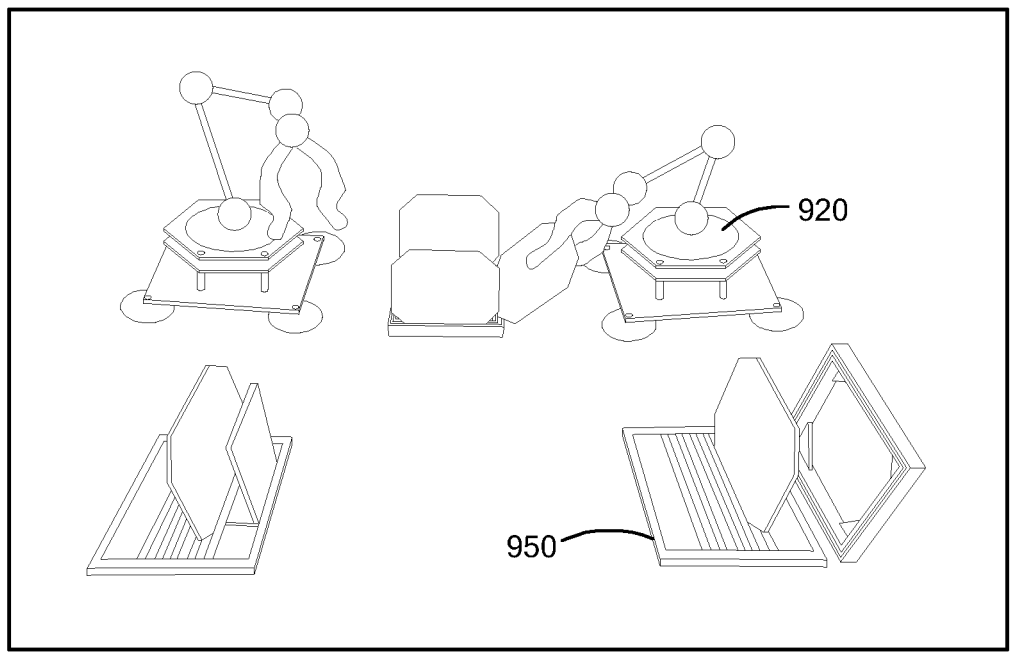
Figure 9D:
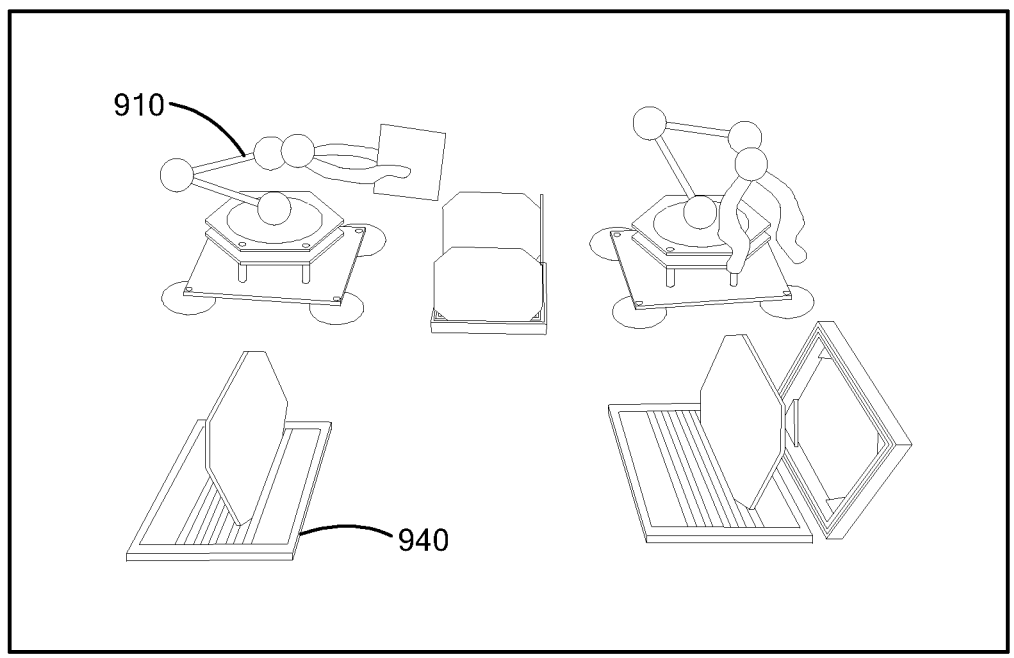
Figure 9E:
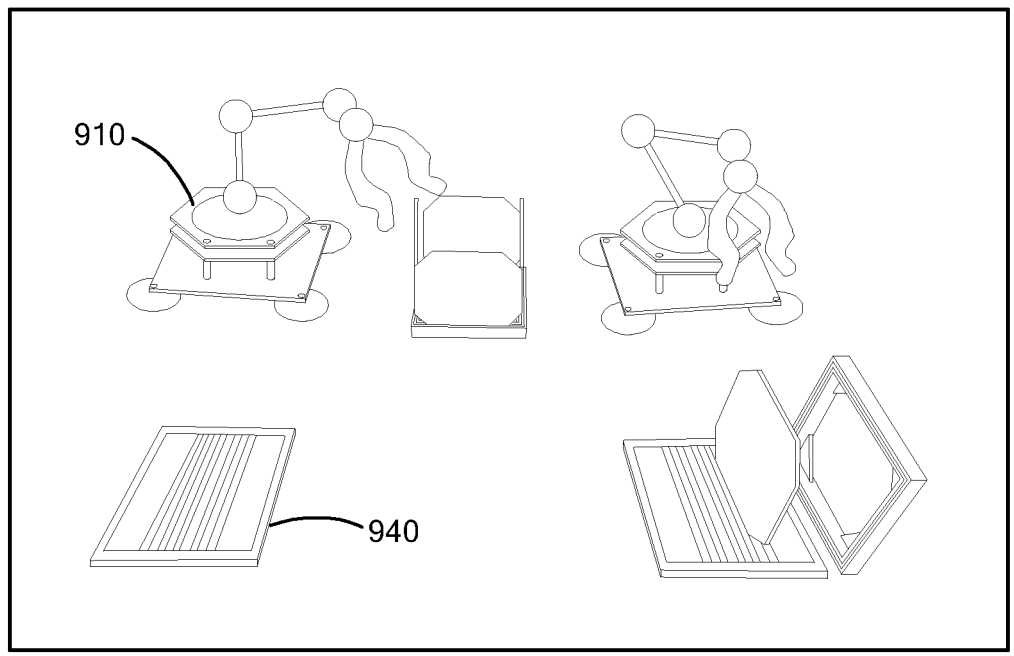
Figure 9F:
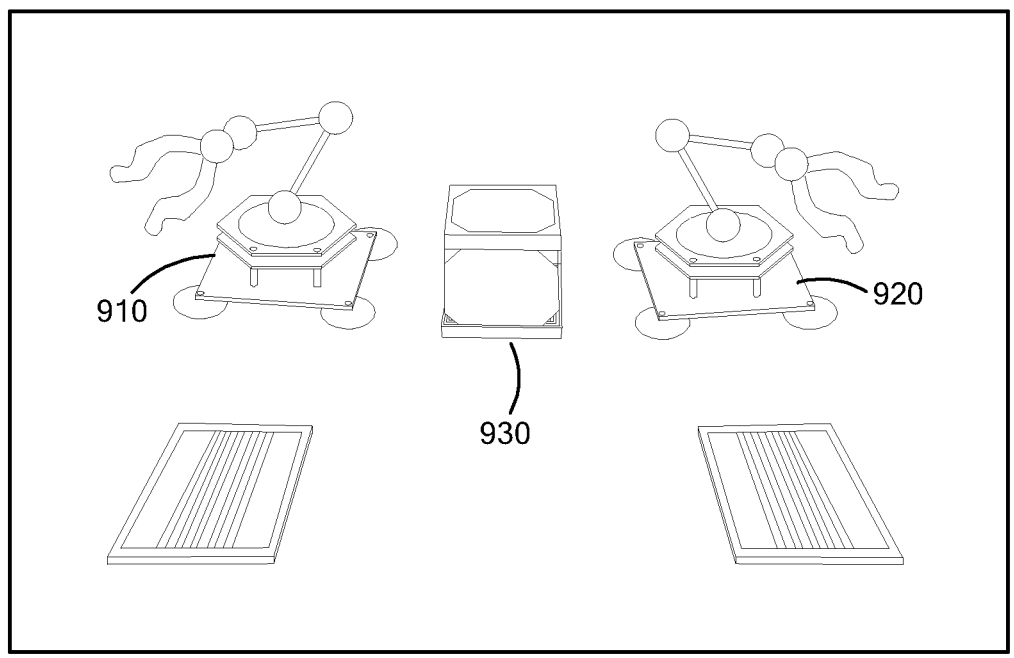

In FIG. 9A, the robots 910 and 920 are shown relative to an assembly platform 930, which in some embodiments may correspond to a base or base frame support of the CubeSat. Two racks 940 and 950 store respective parts 960 and 970 of a CubeSat to be assembled. The parts include a modular printed circuit board including the controller and other components described herein, and various portions of the housing. In FIG. 9A, robot 920 retrieves a first modular board from rack 950 and places the board on the assembly platform. In FIG. 9B, robot 910 retrieves a second modular board from rack 940 and places it on the assembly platform at a position opposing the first board. In FIG. 9C, robot 920 retrieves and places another board into a position wherein it is electrically connected. In FIG. 9D, robot 910, retrieves the processor board and places it into position. In FIG. 9E, the same robot may retrieve another modular board and place it into position. In FIG. 9F, the top board is retrieved by robot 920 and coupled into position. The coupling of all of these features may be accomplished, for example, by snapping, magnets, screws, or performing other types of fastening or coupling techniques by the robots.

Figure 10:
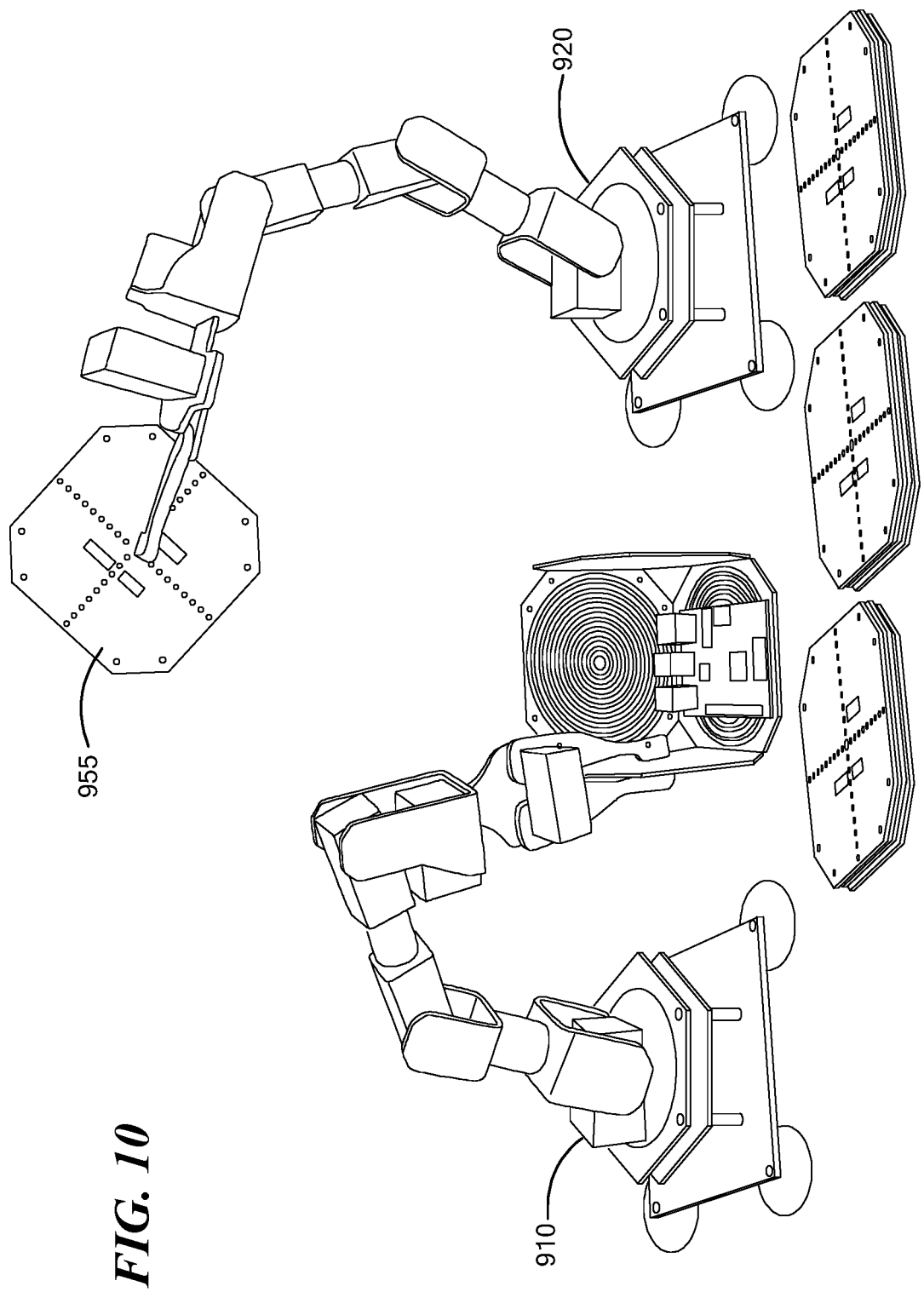
FIG. 10 is an perspective diagram of a pair of robot arms performing operations to assemble a satellite from components parts (such as the example circuit boards illustrated in FIGS. 8A-8C).

FIG. 10 is an exploded perspective diagram of the operation performed in FIG. 9C for connecting a processor board 955. Because the processor board is in modular form, the robot may place the board into the programmed position, where in this embodiment, it physically and electrically snaps into position to form a mechanical mounting and electrical connection to the various electrical components of the CubeSat. Additional electrical components may be connected by the robot as in accordance with specifications and instructions from the controller.

In one or more embodiments, operation(s) may be performed to ensure dipole strengths are near a predetermined level (e.g., 0.5 A-m$^2$) for sufficient passive attitude control. In one embodiment, passive attitude control may be implemented using a permanent magnet, which, for example, may be aligned along a predetermined axis (e.g., Z axis) of the CubeSat. The permanent magnet may slowly align the satellite to the magnetic field of Earth, thus placing the CubeSat in a desired attitudinal orientation. Rotation and/or other spurious movements of the satellite may be dampened, for example, by three orthogonal μ-metal strips mounted on the microcontroller board. Various calculations may be performed by the controller (e.g., corresponding one of the boards) to show relative motion and control of the robot arms and various components using the dynamic equations of motion. Examples of these equations which may be computationally performed by the controller are given below.

The maximum slew rate ($\omega_{max,SC}$) of the satellite may be determined based on Equation 1:

$$\omega_{max,SC} = \frac{n_L L_{max,RW}}{MOI_{SC}} \quad (1)$$

where:
$n_L$ is the fraction reaction wheel momentum available, which, for example, may be assumed to be a predetermined value (e.g., a value of 1),
$L_{max,RW}$ is the maximum reaction wheel angular momentum, and
$MOI_{SC}$ is the (maximum axis) moment.

The inertia of the spacecraft may be determined (or predetermined) by calculations of the controller (e.g., controller 40). This may result in a predetermined maximum (e.g., of 19 degrees per second) for a one-to-six U CubeSat using, for example, the Blue Canyon Technologies RWP50 system. The controller may calculate the maximum angular acceleration $\alpha_{max,SC}$ of the spacecraft based on Equation 2:

$$\alpha_{max,SC} = \frac{\tau_{max,RW}}{MOI_{SC}} \quad (2)$$

where $\tau_{max,RW}$ is the maximum reaction wheel torque.

The time for slew of the satellite from over time may be determined based on Equations 3 and 4:

$$\Delta t_{slew} = \frac{\Delta\theta}{\omega_{max,SC}} + \frac{\omega_{max,SC}}{\alpha_{max,SC}} \quad \text{if } \Delta\theta \geq \frac{\omega^2_{max,SC}}{\alpha_{max,SC}} \quad (3)$$

$$\Delta t_{slew} = \sqrt{\frac{\Delta\theta}{\alpha_{max,SC}}} \quad \text{if } \Delta\theta < \frac{\omega^2_{max,SC}}{\alpha_{max,SC}} \quad (4)$$

where Δθ is the angle of the slew. This results in sixteen seconds for 180-degree slews. In one embodiment, reaction wheels may be used to control the orientation of the system housing and eliminate the base linear motion from the equations of motion. The effect of using reaction wheels on the dynamics of the system may be divided, for example, into two components: (1) components corresponding to the generalized momentum of the reaction wheels and (2) components included in the dynamics by modifying the inertial properties of the base of the system. The resulting form of kinetic energy may be used in Lagrange's equation to obtain the dynamic equations of motion.

In addition to the aforementioned features, in one embodiment the CubeSat may use Kapton heaters and may be designed to be passive until further analysis demonstrates active heating is to be performed. The operational temperature may be within a predetermined range (e.g., −20° C. to 40° C.). Surface optical properties may be designed for thermal balance. Many of the components of the satellite may have built-in temperature sensors, which can be monitored with an on-board RTD temperature sensor such as Honeywell 480-4982-ND RTD. Extra RTDs can be implemented to monitor the temperature of the payload.

In order to perform active heating, in one embodiment the controller may calculate steady-state radiator sizing based on Equation 5:

$$A(Q_{Solar}+Q_{IR}+Q_{Albedo})+Q_{Electronic}=A\varepsilon\sigma(T_{rad}^4) \quad (5)$$

where:
$Q_{solar}$ is a predetermined value (e.g., zero) and always pointing the radiator away from the sun,
$Q_{IR}$ is the total heat incident on the spacecraft system,
$Q_{Albedo}$ is the value of the radiating heat flux due to Earth albedo effects,
$Q_{Electronic}$ is the heat rate of the electronics,
A is the total surface area,
ε is the emissivity of the radiating surface,
σ is the Stefan Boltzmann constant (5.67×10$^{-8}$ W/(m$^2$K$^4$)) where W is watts, m is meters, and K is temperature in Kelvin and where the quantity (W/m$^2$) corresponds to units of intensity, and
$T_{rad}$ is the radiator temperature.

In one embodiment, an on-board radiator for providing active heating may be coated with paint of a color (e.g., white) such that ε=0.83 and α=0.20. The payload may be insulated from the spacecraft (e.g., thermal isolators may be used to attach the payload to the bus). The Z+ face of the satellite—with the aperture—may always be nadir pointing. A large conduction path may exist from the payload to the radiator. In one example, the orbit-averaged electronic heat used may be calculated from 0.85 (efficiency of electronics)×0.30 (percentage of orbit where payload operates)×30 W (heat load).

In the CubeSat, an on-board computer (e.g., 520 in FIG. 5) may receive requests to cycle power to various features and boards (including the payload) and may use energy from the solar arrays to charge the batteries. The solar panels (e.g., 510 in FIG. 5) may be constructed, for example, using 28% UTJ (Ultra-efficient Triple-Junction) solar cells that provide 433 mA at 2.35 VDC. Each cell may cover a predetermined portion (e.g., one-half) of a 1 U CubeSat face. In this case, two cells may be connected in series on each solar array board to provide 4.7 VDC at 433 mA (~2 W) from each board, for example, assuming full illumination and operation at maximum power. Each of the solar array boards may be connected in parallel. The EPS (e.g., 550 in FIG. 5) may use peak power tracking (PPT) to regulate the current extracted from the solar cell array to ensure the array remains at peak power. The EPS may charge four lithium-polymer batteries configured as two series pairs of batteries in parallel. Together, these batteries may provide 4.4 Ah at 7.4 V. Additionally, the batteries may have flight heritage onboard the ISS. In one embodiment, an additional battery or EPS testing may be performed by the ISS prior to flight.

The CubeSat may be equipped with propulsion capability to allow for orbital adjustments. To allow for this capability, the robot(s) may mount modular parts into the satellite housing including at least one thruster, e.g., controlled by thrust controller 60 in FIG. 1. The thruster may or may not have moving parts and, for example, may operate based on a predetermined protocol (e.g., RS-422, RS-485, or another protocol) having packet structures for returning data. The thruster components may be modular for ease of assembly. An example of such a thruster is the IFM Nano thruster or a BIT-3 propulsion system, but other thrusters or propulsion systems may also be incorporated into the CubeSat. In one case, the BIT-3 may use 28 V regulated input power and the thruster can accept 12 V or 28 V.

In one embodiment, translational separation velocity may also be controlled for deploying the CubeSat, for example, along the rail(s) that lead to the housing door. In one embodiment, Poly Picosatellite Orbital Deployers (P-POD) deployment may be used for this purpose. Such a deployment technique may be suitable when, for example, the deployment is to be performed at a rate greater than 2.1 cm/s. These measures may be taken to avoid unnecessary conjunction of multiple components while meeting CubeSat requirements.

In one embodiment, communication among the various components of the satellite may be performed using one or more protocols. An example is the IEEE 802.11b protocol which operates in the 2.4-2.4835 GHz range. The communication system (e.g., 540 in FIG. 5) may also include WiFi capability to be used as a local area network (LAN) connected to the internet via an access point. In one embodiment, a point-to-point configuration (e.g., ESP32) may be used. ESP32 is a low-power microcontroller with integrated WiFi and dual-mode Bluetooth, which includes built-in antenna switches, power amplifier, low-noise receive amplifier, filters, and power management modules.

In a WiFi embodiment, the communication system may use the unlicensed spectrum, may incorporate the Barker code or Complementary Code Keying (CCK) for error detection, and Phase-Shift Keying (PSK) modulation. The maximum range of WiFi may be about one mile since either all packets must be acknowledged within a set time period or they are retransmitted. Beyond a mile, transmission time usually exceeds the acknowledgment timeout. In one embodiment, a few settings within the WiFi standard may be modified to create a half-duplex link which allows packets to be send to a ground station. Additionally, the payload transmitter may be initialized into "packet injection" mode, which sends packets to broadcast addresses and thus does not require acknowledgment. Also, the payload transmitter may be set, for example, to only 1 Mbps although the IEEE 802.11b standard supports up to 11 Mbps, to provide 10.4 dB of processing gain and subsequent link margin. The ground station may include another WiFi dongle attached to a laptop, and the laptop may initialize its WiFi in monitor mode.

Table 2 shows example parameters that may be used for the communication unit. In this example, the communication unit may use a ground station-to-CubeSat radio link for sending commands to the satellite and receiving data from the satellite. The ground station may operate, for example, in the 435 MHz (UHF) amateur frequency band. To avoid designing a new ground station, one embodiment may use an EyeStar Simplex radio, provided by NSL, which communicates with the GlobalStar satellite constellation. Such a system may provide 24/7 data downlink to ground receiving gateways located around the globe, tied to a secure NSL data server, from which can be viewed near-real-time (e.g., two-minute latency) health and science data on smartphones and laptops anytime, anywhere. A low data rate (e.g., 3 bps) may be adequate for the relatively small data volumes expected for the project.

Data received by the ground gateways maybe made available via an Internet portal. In one example, two types of packets may be transmitted from the EyeStar radio. The first type of packet is a Satellite Health Packet (e.g., an 18-byte packet that will be transmitted at a regular interval to report the temperature and bus voltage of the satellite). The second type of packet is a Payload Packet (e.g., a 36-byte packet containing the data from the payload board that will be transmitted at regular intervals). The data rate may be, for example, 50-100 kB/day, which may be primarily limited by the expected power budget and data rate costs. Using the flight-proven Simplex radio ensures that a beacon will still be received independent of other CubeSat subsystems. This beacon will indicate satellite functionality in the event of a payload or microcontroller failure. A Data budget is shown in Table 2.

TABLE 2

| UHF Transmitter | |
|---|---|
| Frequency range | 400-450 MHz (Crystal controlled) |
| Transmit Power | 300 mW PEP, 150 mW average |
| Data Rate Options | 50-100 kB/day |
| VHF Receiver | |
| Frequency range | 130-160 MHz (Crystal Controlled) |
| Data rate | 300-1200 bit/s |
| Mass | 85 g |
| Power | <2.1 W (transmit on), <0.2 W (receiver only) |
| Data | I2C bus interface |

The stored parts to be assembled by the robot(s) may be configured as optimized modules and arranged in flat-pack configurations in preparation for launch. This may significantly reduce costs per volume. In one embodiment, a "smart deployer" may be used which includes launched pre-integrated SmallSats packaged in a deployer and a free-flying "locker" which robotically assembles and deploys CubeSats on-orbit as needed. In some implementations, a group of satellites may be launched together as part of a constellation and, for example, may be referred to as a tranche.

Figure 11A:
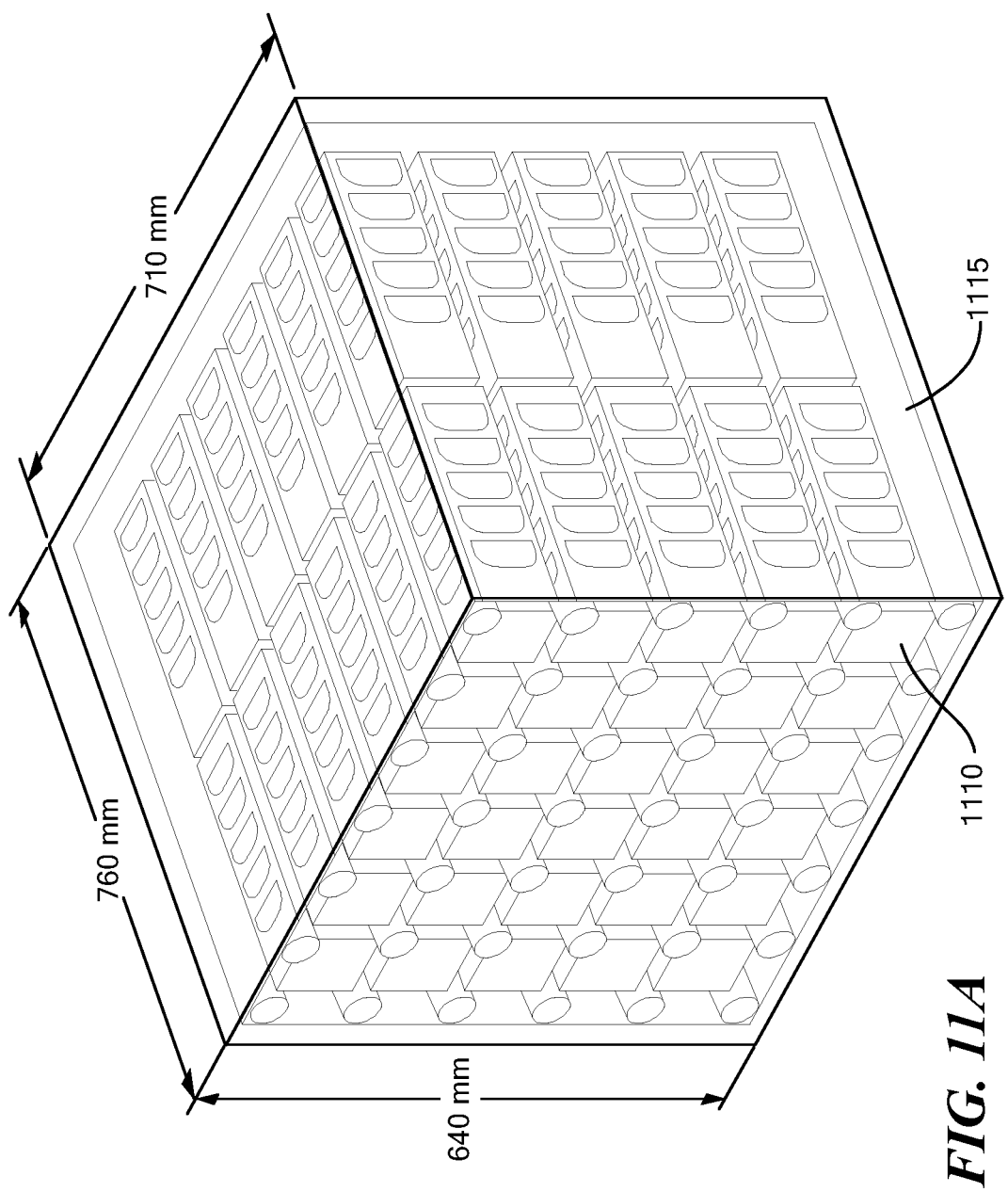

FIGS. 11A and 11B show examples of how a plurality of CubeSats (or CubeSat components) may be stored for transport to the microgravity environment and/or inside of the system housing. In the embodiment of FIG. 7A, sixty 3 U CubeSats 1110 are shown housed in a deploy-only locker 1115. In the embodiment of FIG. 7B, components 1120 for one hundred and twenty 3 U CubeSats are stored vertically and horizontally, for example, in a stacked configuration. Two Robot arms 1130 and 1140 are stowed in a predetermined manner on the deployment door(s) 1150 of the housing 1160. Instead of 3 U CubeSats, the components of other types of CubeSats (e.g., 1 U or 2 U) and/or types of satellites may be stacked and stored per unit volume in the housing, for example, in modular form. When deployed in orbit, the system robot(s) may deploy the pre-assembled CubeSats as in FIG. 11A or may automatically assemble the components of the CubeSats as in FIG. 11B at certain times, which times, for example, may be pre-programmed or activated by a signal sent from a host system or base station.

The embodiments of the automatic satellite assembly system described herein may be used in various mission scenarios.

Figure 12C:
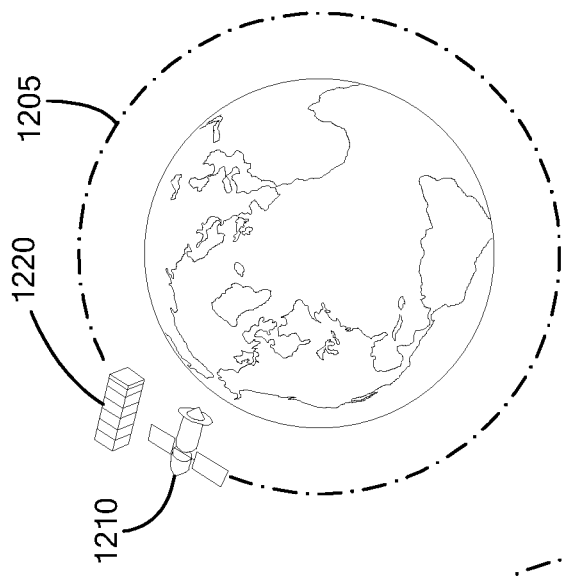
FIGS. 12A to 12C are diagrams indicating an example of performing a mission of supporting LEO and GEO assets.
Figure 12B:
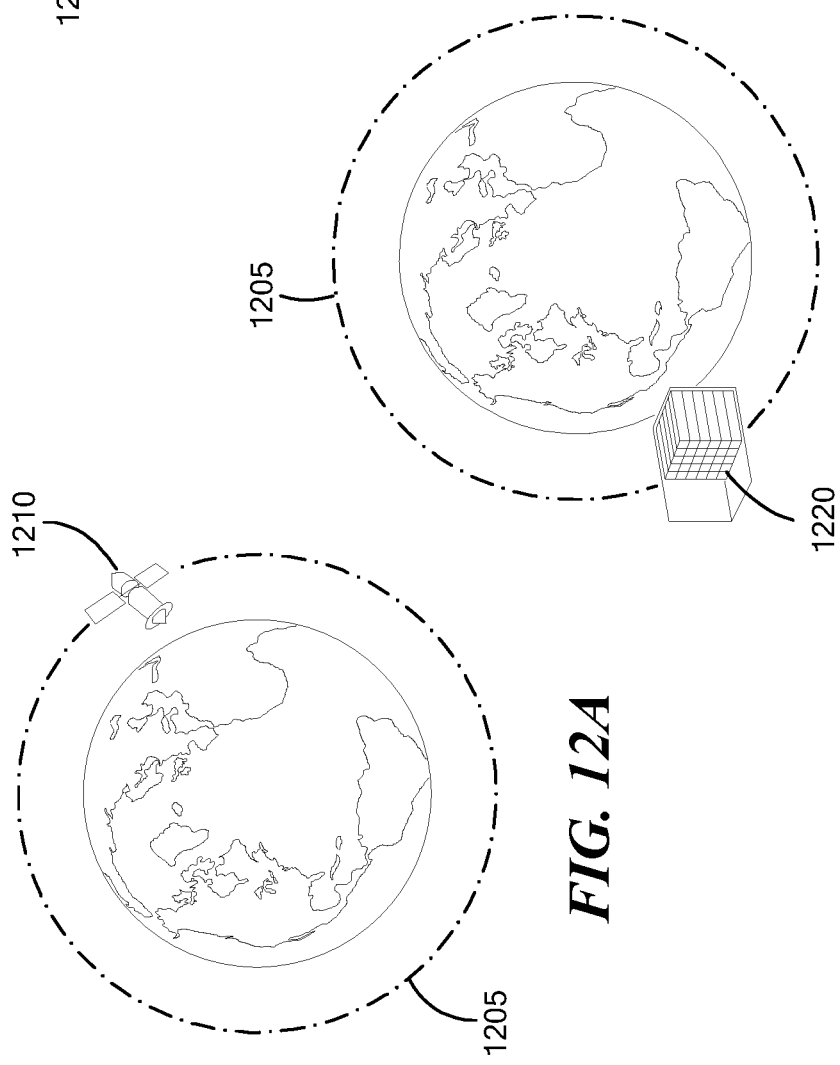
Figure 12A:
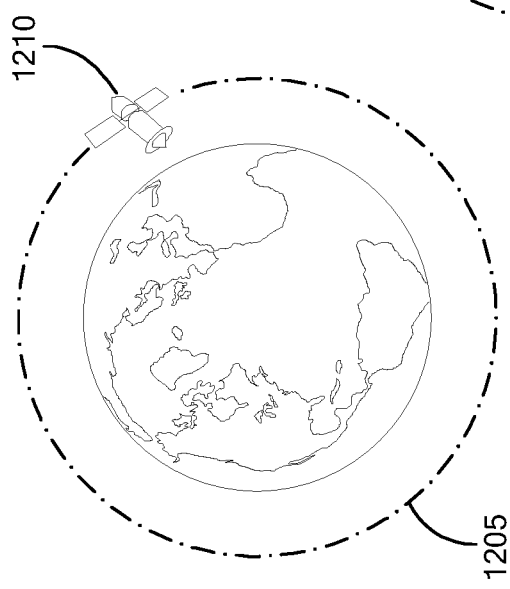

FIGS. 12A to 12C show operations perform for a mission of supporting LEO and GEO assets. As shown in FIG. 12A, a satellite 1210 in a Low Earth Orbit (LEO) 805 (e.g., a 550 km sun-synchronous orbit) may be compromised, for example, as a result of a malfunction or experiencing damage. In this situation, a host system (e.g., on a space station or base station on Earth) may transmit signals to the controller of the automatic satellite assembly system 1220 to perform an inspection and/or replacement mission, as shown in FIG. 12B. Upon receiving instructions, the system may set a course for the malfunctioning satellite and engage its propulsion system. While on the way or when it arrives, the system 1220 may automatically assemble and deploy a satellite to inspect and/or replace the malfunctioning satellite, as shown in FIG. 12C. In one embodiment, the system 1220 may remain in position and program into a controller of the assembled satellite coordinates for causing a propulsion system of the assembled satellite to arrive at the location of the malfunctioning satellite.

Figure 13A:
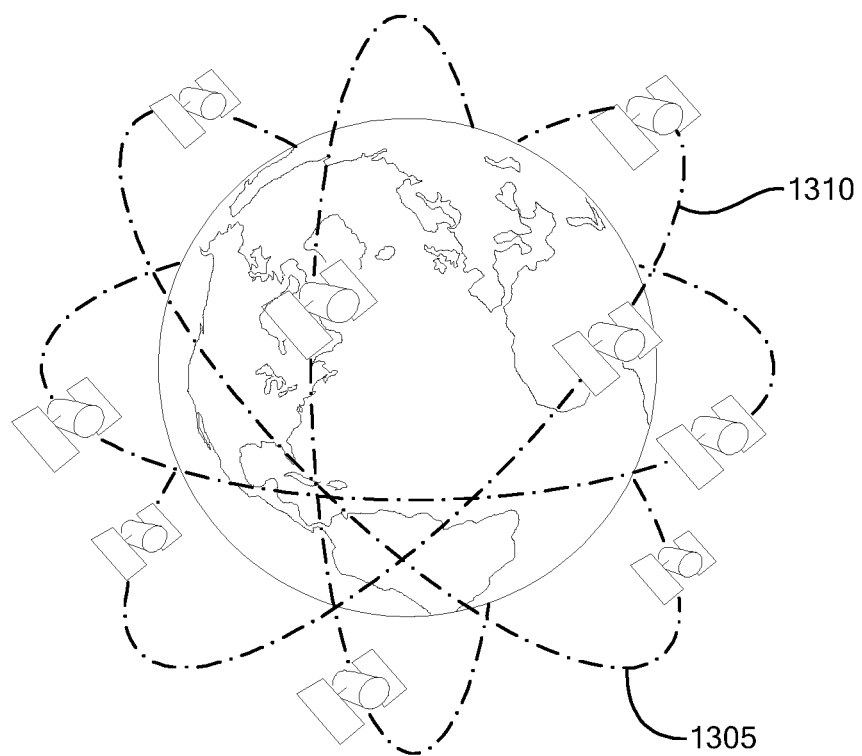
FIGS. 13A, 13B and 13D illustrate an example of an automatic satellite assembly system controlled to perform different operations in a mission of reconstituting a satellite in a constellation of moving satellites (e.g. satellites orbiting a celestial body (such as the Earth) or other body).
Figure 13B:
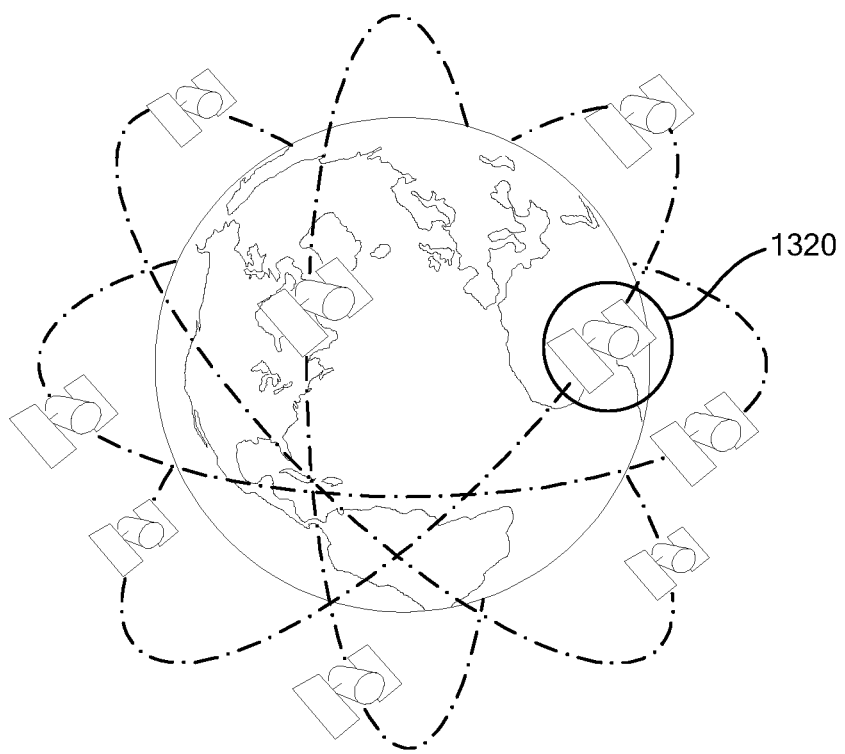
Figure 13C:
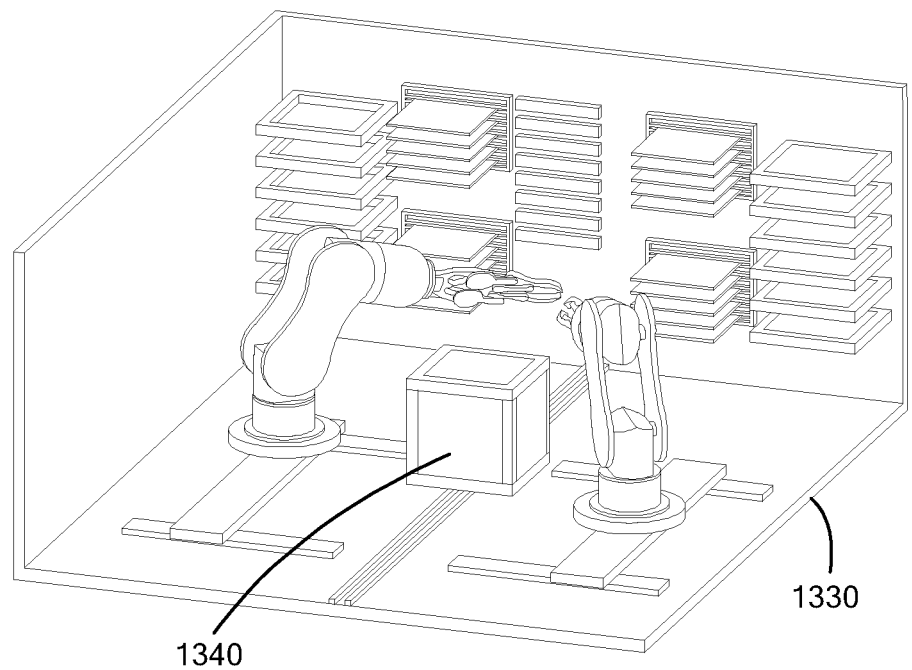
FIG. 13C is a perspective sectional view of an embodiment of an automatic satellite assembly system which includes two robot arms and may be used for automatic satellite assembly system in the example process of replacing a satellite within a constellation of moving satellites as illustrated in FIGS. 13A, 13B, 13D.
Figure 13D:
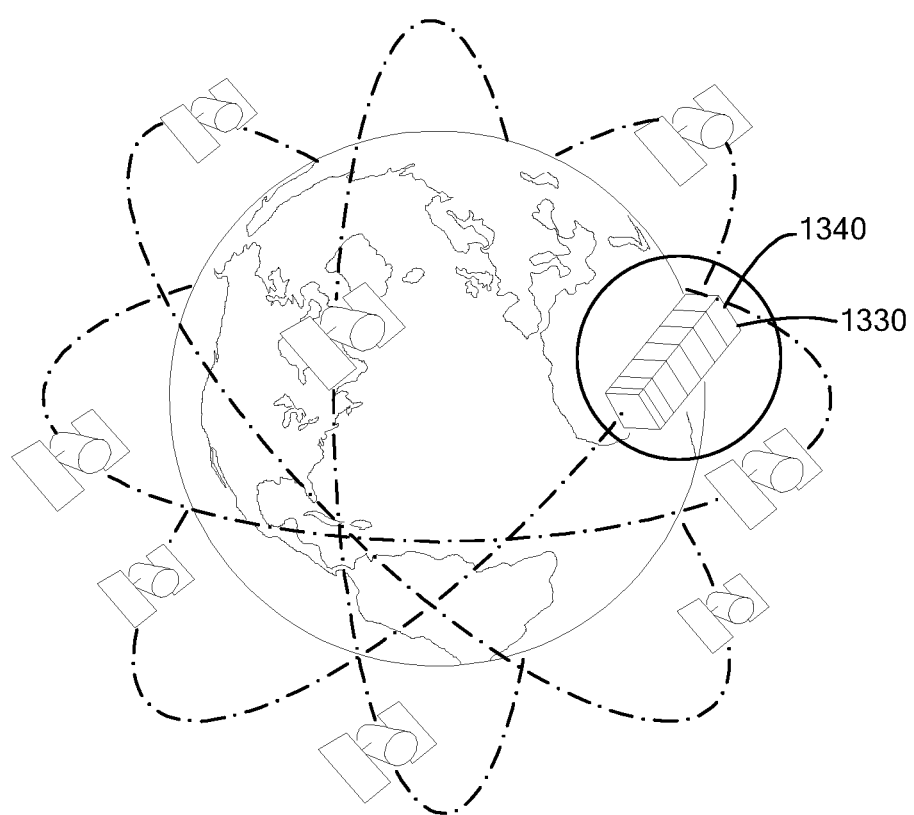

FIGS. 13A to 13D show operations performed for a mission of reconstituting constellations. In FIG. 13A, an example is shown of a constellation of satellites 1310 with all functioning nodes operating within a predetermined number of LEO orbits 1305. In FIG. 13B, a situation arises where one node 1320 loses battery power and becomes unresponsive. Without on-orbit spares, redistributing the constellation will increase the range and decrease the data rate until the node is replaced. In FIG. 13C, a space station, base station, or other host system transmits instructions to the communication unit of the automatic satellite assembly system 1330, which, for example, may correspond to the system of FIG. 3. The controller of the system then controls the robot(s) to assemble a CubeSat 1340 to replace the malfunctioning node. In FIG. 13D, the replacement CubeSat is deployed from the system and normal functioning of the constellation returns.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, logic, managers, computers, system, units, and other signal generating and signal processing features of the embodiments described herein may be implemented in non-transitory logic which, for example, may include hardware, software, or both. When implemented at least partially in hardware, the controllers, processors, logic, and managers, computers, system, units, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, logic, and managers, computers, system, units, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments described herein.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with an embodiment, it may be within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming or positioning part (or element) "A" over part (or element) "B" include situations in which one or more intermediate parts (or elements) (e.g., part "C") is between part "A" and part "B" as long as the relevant characteristics and functionalities of part "A" and [art "B" are not substantially changed by the intermediate part(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary layers or structures at the interface of the two elements. Although the concepts presented herein have been described with reference to a number of illustrative embodiments, it should be understood that numerous other modifications and embodiments can be devised by those skilled in the art that will fall within the spirit and scope of the described concepts. More particularly, reasonable variations and modifications are possible in the component parts and/or arrangements of the subject combination arrangement within the scope of the foregoing disclosure, the drawings and the appended claims without departing from the spirit of the concepts described herein. In addition to variations and modifications in the component parts and/or arrangements, alternative uses will also be apparent to those skilled in the art. The embodiments may be combined to form additional embodiments.

We claim:

1. An unmanned spacecraft, comprising:
    a housing configured to be deployed in a microgravity environment, the housing having an access point configured to allow access to the microgravity environment, a parts storage area configured to store parts of a satellite, and an assembly platform;
    a first robot movably positioned in the housing, the first robot disposed in the housing so as to be able to reach at least some parts of a satellite stored in the parts storage area; and
    a controller configured to control the first robot to move to access parts of a satellite from the parts storage area and to assemble parts of a satellite on the assembly platform and to control deployment of an assembled satellite through the access point of the housing to a position in the microgravity environment.

2. The unmanned spacecraft of claim 1, further comprising one or more parts of a satellite disposed in the parts storage area, wherein one or more of the one or more parts of a satellite are in modular form.

3. The unmanned spacecraft of claim 1, further comprising:
    a communication system in the housing,
    wherein the controller is further configured to control the first robot to assemble parts of a satellite and deploy an assembled satellite to a position in the microgravity environment based on information received from the communication system.

4. The unmanned spacecraft of claim 1, further comprising:
    a second robot adjacent to the first robot,
    wherein the controller is further configured to control the second robot to access parts of a satellite from the parts storage area and to operate in synchronization with the first robot to assemble parts of a satellite to form a satellite on the assembly platform.

5. The unmanned spacecraft of claim 1, further comprising:
    a thrust controller configured to control movement of the housing within the microgravity environment.

6. The unmanned spacecraft of claim 1, wherein the controller is further configured to control opening of the access point of the housing to deploy an assembled satellite at the position in the microgravity environment.

7. The unmanned spacecraft of claim 3, wherein:
    information received from the communication system designates an assembled satellite as a replacement satellite, and
    the replacement satellite is configured by the first robot to replace a satellite in the microgravity environment.

8. The unmanned spacecraft of claim 1, wherein the controller includes:
    a first controller configured to control the first robot;
    a second controller configured to control deployment of an assembled satellite; and
    a third controller configured to control thrust to move the housing within the microgravity environment, wherein at least two of the first controller, the second controller, or the third controller are configured to operate in synchronization.

9. The unmanned spacecraft of claim 1, wherein the parts storage area is configured to store:
    a satellite controller,
    a satellite communication system;

a plurality of frame parts; and
one or more sensors.

10. The unmanned spacecraft of claim 7, wherein the assembled satellite is a CubeSat.

11. A method of assembling a satellite, comprising:
(a) receiving information to assemble a satellite from a host system;
(b) controlling a first robot to move to access parts from a storage area, wherein at least some of the parts are satellite parts;
(c) controlling the first robot to assemble satellite parts to form the satellite as an assembled satellite; and
(d) controlling deployment of the assembled satellite to a position in a microgravity environment, wherein the storage area, the first robot, a communication system for performing (a), and a controller for performing (b) to (d) are located in a housing of an unmanned spacecraft deployed in the microgravity environment and wherein (d) includes deploying the assembled satellite through an access point of the housing.

12. The method of claim 11, wherein one or more of the satellite parts are in modular form.

13. The method of claim 11, wherein:
the satellite parts are assembled in (c) on an assembly platform; and
controlling deployment of the assembled satellite in (d) further includes controlling movement of the assembly platform to deploy the assembled satellite through the access point of the housing.

14. The method of claim 11, further comprising:
controlling a second robot located in the housing to access parts from the storage area, wherein the first robot and the second robot are controlled in synchronization by the controller.

15. The method of claim 11, further comprising:
controlling a thruster to move the unmanned spacecraft within the microgravity environment to deploy the assembled satellite.

16. The method of claim 11, further comprising:
controlling opening of the access point of the housing to deploy the assembled satellite at the position in the microgravity environment.

17. The method of claim 11, wherein:
the information received at the communication system designates the assembled satellite as a replacement satellite, and
the replacement satellite is configured by the first robot to replace a satellite in the microgravity environment.

18. The method of claim 11, wherein:
(b) and (c) are performed by a first controller;
(d) is performed by a second controller; and
controlling a thruster by a third controller to move the unmanned spacecraft within the microgravity environment, at least two of the first controller, the second controller, or the third controller are configured to operate in synchronization.

19. The method of claim 11, wherein controlling the first robot to assemble the satellite parts comprises, controlling the first robot to assemble at least a satellite controller, a satellite communication system, a plurality of frame parts, and one or more sensors, to form at least a portion of the assembled satellite.

20. The method of claim 11, wherein the assembled satellite is a CubeSat.

* * * * *